US010550627B2

(12) United States Patent
Vogel-Martin et al.

(10) Patent No.: US 10,550,627 B2
(45) Date of Patent: Feb. 4, 2020

(54) VACUUM GLAZING PILLARS FOR INSULATED GLASS UNITS AND INSULATED GLASS UNITS THEREFROM

(71) Applicant: 3M INNOVATIVE PROPERTIES COMPANY, St. Paul, MN (US)

(72) Inventors: Margaret M. Vogel-Martin, Forest Lake, MN (US); Lyudmila A. Pekurovsky, Bloomington, MN (US); Gordon A. Kuhnley, St. Paul, MN (US); Brian K. Nelson, Shoreview, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 121 days.

(21) Appl. No.: 15/554,586

(22) PCT Filed: Mar. 7, 2016

(86) PCT No.: PCT/US2016/021155
§ 371 (c)(1),
(2) Date: Aug. 30, 2017

(87) PCT Pub. No.: WO2016/144857
PCT Pub. Date: Sep. 15, 2016

(65) Prior Publication Data
US 2018/0238105 A1    Aug. 23, 2018

Related U.S. Application Data

(60) Provisional application No. 62/132,073, filed on Mar. 12, 2015.

(51) Int. Cl.
*E06B 3/663*    (2006.01)
*B32B 3/30*    (2006.01)
(Continued)

(52) U.S. Cl.
CPC ............ *E06B 3/66304* (2013.01); *B32B 3/30* (2013.01); *B32B 7/05* (2019.01); *B32B 17/06* (2013.01);
(Continued)

(58) Field of Classification Search
CPC ............... E06B 3/66304; E06B 3/6612; E06B 2003/66385; B32B 3/30; B32B 7/045;
(Continued)

(56) References Cited

U.S. PATENT DOCUMENTS 5,124,185 A * 6/1992 Kerr ...................... E06B 3/6612
428/34
5,657,607 A    8/1997 Collins et al.
(Continued)

FOREIGN PATENT DOCUMENTS

EP    0293163    11/1988
EP    0999330    5/2000
(Continued)

OTHER PUBLICATIONS

Collins, "Measurement of local heat flow in flat evacuated glazing," International Journal Heat Mass Transfer, 1993, vol. 36, No. 10, pp. 2553-2563.
(Continued)

*Primary Examiner* — Donald J Loney
(74) *Attorney, Agent, or Firm* — Thomas M. Spielbauer

(57) ABSTRACT

The present disclosure relates to pillars useful in the fabrication of insulated glass units, particularly, vacuum glazing, insulated glass units. The invention also relates to insulated glass units containing said pillars. The present disclosure provides a pillar for use in a vacuum insulated glass unit wherein the pillar includes a body. The body includes a plurality of first structures, at least one first void region between the plurality of first structures; and a first land surface region located between the plurality of first structures and at least one first channel having first and second ends and a first channel opening proximate the first surface of the body. The first channel is in fluid communication with the local environment through at least one of its first and second ends, and the at least one first void region is in fluid communication with at least one of the local environment in a direction parallel to the first surface and the at least one first channel. The height of the plurality of first structures is less than the depth of the first channel.

20 Claims, 11 Drawing Sheets

(51) Int. Cl.
*B32B 7/05* (2019.01)
*B32B 17/06* (2006.01)
*E06B 3/66* (2006.01)

(52) U.S. Cl.
CPC ........ *E06B 3/6612* (2013.01); *B32B 2250/02* (2013.01); *E06B 2003/66385* (2013.01); *Y02A 30/25* (2018.01); *Y02B 80/24* (2013.01); *Y10T 428/2457* (2015.01); *Y10T 428/24479* (2015.01); *Y10T 428/24612* (2015.01)

(58) Field of Classification Search
CPC ..... B32B 2250/02; Y02B 80/22; Y02B 80/24; Y10T 428/24479; Y10T 428/2457; Y10T 428/24612
See application file for complete search history.

(56) References Cited

U.S. PATENT DOCUMENTS

| | | | | |
|---|---|---|---|---|
| 5,902,652 | A * | 5/1999 | Collins | C03C 27/10 428/34 |
| 6,326,067 | B1 * | 12/2001 | Veerasamy | E06B 3/6612 428/34 |
| 6,387,460 | B1 | 5/2002 | Shukuri et al. | |
| 6,479,112 | B1 | 11/2002 | Shukuri et al. | |
| 2010/0260950 | A1 | 10/2010 | Tang | |
| 2013/0101759 | A1 | 4/2013 | Jones | |
| 2015/0079313 | A1 | 3/2015 | Vogel-Martin et al. | |
| 2015/0079363 | A1 | 3/2015 | Free et al. | |
| 2016/0214903 | A1 | 7/2016 | Humpal et al. | |

FOREIGN PATENT DOCUMENTS

| | | |
|---|---|---|
| WO | WO 00/66868 | 11/2000 |
| WO | WO 2013/055536 | 4/2013 |
| WO | WO 2014/081693 | 5/2014 |
| WO | WO 2015/038890 | 3/2015 |
| WO | WO 2016/140840 | 9/2016 |
| WO | WO 2016/144857 | 9/2016 |

OTHER PUBLICATIONS

Kocer, "Vacuum glazing; a thermally insulating window technology," Applied and Plasma Physics Group, University of Sydney, Feb. 2013, pp. 1-34.

Wilson, "Heat Conduction Through the Support Pillars in Vacuum Glazing," Solar Energy, 1998, vol. 63, No. 6, pp. 393-406.

International Search Report for PCT International Application No. PCT/US2016/021155, dated Jun. 10, 2016, 5 pages.

* cited by examiner

—— 100μm

—— 100μm

— 100μm

— 10μm

——— 100μm

——— 100μm

VACUUM GLAZING PILLARS FOR INSULATED GLASS UNITS AND INSULATED GLASS UNITS THEREFROM

CROSS REFERENCE TO RELATED APPLICATIONS

This application is a national stage filing under 35 U.S.C. 371 of PCT/US2016/021155, filed Mar. 7, 2016, which claims the benefit of U.S. Provisional Application No. 62/132,073, filed Mar. 12, 2015, the disclosures of which are incorporated by reference in their entireties herein.

TECHNICAL FIELD

The present disclosure relates to pillars useful in insulated glass units (IGUs), particularly vacuum glazing, insulated glass units and insulated glass units containing the same.

BACKGROUND

Pillars useful for insulated glass units have been described in, for example, U.S. Pat. No. 6,479,112 and U.S. Pat. Publ. No. 2010/0260950.

SUMMARY

Single pane, glass windows are generally poor thermal insulators and their use in buildings results in significant heat loss for the structure and leads to both higher building maintenance costs, due to higher heating/cooling costs, and higher initial fabrication costs, as the heating/cooling equipment specified for the building must be larger to compensate for the energy losses. Double pane windows, which include two glass panes with major surfaces substantially parallel to one another with a "space" or "gap" there between, are an improvement, as they provide a thermally insulating layer of gas, e.g. air, argon or the like, in the space between the window panes. Further improvement in a window's insulating capability can be achieved if the space between a double pane window is free of gas, i.e. the space is sealed and a vacuum is applied, removing the gas between the window panes. Windows of this type are often referred to as vacuum insulated glass units. However, in these window constructions, particularly in larger windows, which may be found in, for example, commercial structures, the pressure difference between the interior of the window and the exterior of the window may cause the glass panes to bow inward. The bow is undesirable, as it adds undesirable stress to what generally are brittle materials, e.g. glass, and, in extreme cases, the window panes may contact one another, thereby reducing the thermal insulating effect of the evacuated gap. To solve this problem, manufactures have placed an array of small structures, often referred to as pillars, between the glass panels of a double pane window, to prevent the panels from bowing when vacuum is applied. Windows with this array of pillars are referred to as vacuum insulated glazing units. Window structures, including vacuum glazing, have reduce the bow of the glass panels, with the addition of an array of pillars that supports the window panes and prevent the glass panels from bowing inward.

Vacuum glazing offers an improvement with respect to thermal insulation and the bowing of the glass panes is inhibited by the addition of an array of pillars. However, the pillars create an additional problem. The pillars have a higher thermal conductivity than the evacuated space between panes and each pillar creates a path of heat transfer between the two window panes that reduces the thermal insulating capability of the window. As such, it is generally desirable to keep the total pillar surface area in contact with the glass panes small, to reduce the heat transfer increase associated with the pillars. Additionally, for aesthetic reasons, the total surface area of the pillar and the individual pillars themselves are minimized, to minimize disruption of light propagation through the window and to minimize disruption of a viewer's view through the window. As the surface area of the total array of pillars is generally small, the compressive stress transferred to the pillars from the glass panes may be high and the pillars may fracture, crack and/or deform under the applied load. Thus, the pillars must have a suitably high compressive strength so as not to fail under the applied load. Conversely, the compressive stress the glass panes experience may be exacerbated at the edge of a pillar, as the edge, particularly a sharp edge, e.g. about a 90 degree angle between the face of the pillar contacting the glass and a corresponding pillar side-wall, may cause a stress concentration in the glass at the edge of the pillar. Many current pillar designs currently employ a sharp pillar edge and may be prone to cause the glass to fracture due to stress concentration generated by the edges of the pillar.

Overall, as one decrease the size of the pillars and/or the total surface area of the pillar array, to reduce heat transfer, the compressive stress on an individual pillar is increased and there is a greater tendency for the pillars to fail under the high loads. Thus, there is a need for pillars with improved heat transfer characteristics, e.g. lower thermal conductivity, that can withstand the compressive loads. The present disclosure provides new pillar designs that can lower thermal conductivity through the pillar, by reducing the contact area of the pillar with respect to the glass surfaces and/or improving the load bearing capabilities of the pillar and/or reducing stress concentration in the glass panes generated at the pillar edge. Additionally, if the pillar design includes an intricate structure, the design allows for fluid communication with the local environment throughout the pillar structure, preventing the trapping of undesirable gas within the pillar itself.

The present disclosure relates to pillars useful in the fabrication of insulated glass units, particularly, vacuum glazing, insulated glass units. The invention also relates to insulated glass units containing said pillars.

In one embodiment, the present disclosure provides a pillar for use in a vacuum insulated glass unit comprising:
  a body comprising:
    a first surface and an opposed second surface; wherein the first surface comprises:
      a plurality of first structures, each first structure having a first structure base and a first structure face opposite the base;
      at least one first void region between the plurality of first structures; and
      a first land surface region located between the plurality of first structures, the first land surface region interconnected with the first structure bases;
    at least one sidewall;
    a first peripheral edge adjoining the first surface and the at least one sidewall and a second peripheral adjoining the second surface and the at least one sidewall;
    at least one first channel having first and second ends and a first channel opening proximate the first surface;
  wherein the first channel is in fluid communication with the local environment through at least one of its first and second ends;

wherein the at least one first void region is in fluid communication with at least one of the local environment in a direction parallel to the first surface and the at least one first channel;
wherein the height of the plurality of first structures is less than the depth of the first channel; and
wherein the largest dimension of the body parallel to the first surface is between about 10 microns and about 1000 microns.

In some embodiments, the second surface comprises:
at least one of a plurality of second structures and at least one second channel having first and second ends and a second channel opening proximate the second surface, wherein each second structure has a second structure base and a second structure face opposite the base, at least one second void region between the plurality of second structures, a second land surface region located between the plurality of second structures, the second land surface region interconnected with the second structure bases;
wherein the second channel is in fluid communication with the local environment through at least one of its first and second ends;
wherein the at least one second void region is in fluid communication with at least one of the local environment in a direction parallel to the first surface and the at least one second channel; and
wherein the height of the plurality of second structures is less than the depth of the channel.

In some embodiments, at least a portion of the first peripheral edge and/or second peripheral edge is at least one of a rounded peripheral edge and chamfered peripheral edge.

In some embodiments, the body comprises a continuous inorganic material.

In yet another embodiment, the present disclosure provides a vacuum insulated glass unit having pillars, comprising:
a first glass pane;
a second glass pane opposite and substantially co-extensive with the first glass pane;
an edge seal between the first and second glass panes with a substantial vacuum gap between the first and second glass panes; and
a plurality of pillars, according to any one of pillar embodiments of the present disclosure, disposed between the first and second glass panes.

Figure 1A:
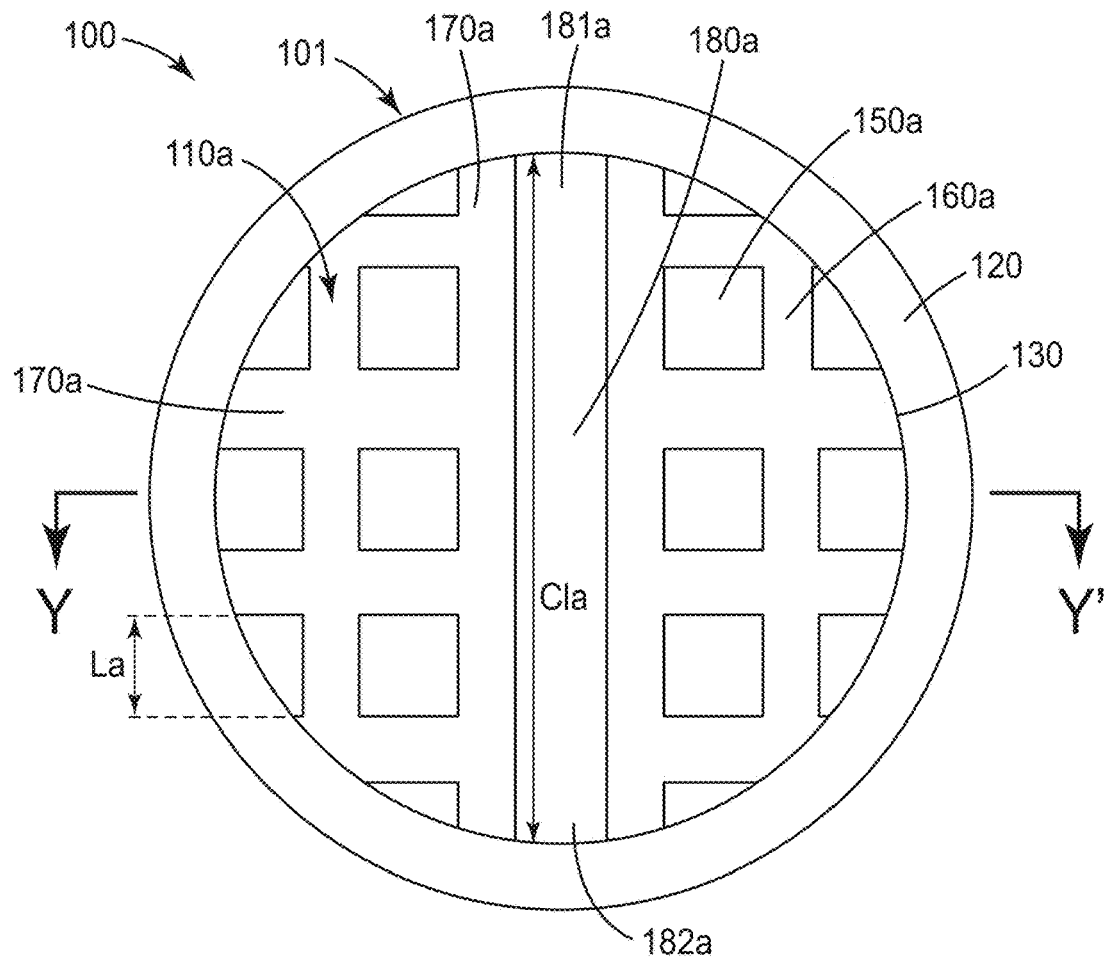
FIG. 1A is a schematic top view of an exemplary pillar according to one exemplary embodiment of the present disclosure.

Repeated use of reference characters in the specification and drawings is intended to represent the same or analogous features or elements of the disclosure. The drawings may not be drawn to scale. As used herein, the word "between", as applied to numerical ranges, includes the endpoints of the ranges, unless otherwise specified. The recitation of numerical ranges by endpoints includes all numbers within that range (e.g. 1 to 5 includes 1, 1.5, 2, 2.75, 3, 3.80, 4, and 5) and any range within that range. Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

It should be understood that numerous other modifications and embodiments can be devised by those skilled in the art, which fall within the scope and spirit of the principles of the disclosure. All scientific and technical terms used herein have meanings commonly used in the art unless otherwise specified. The definitions provided herein are to facilitate understanding of certain terms used frequently herein and are not meant to limit the scope of the present disclosure. As used in this specification and the appended claims, the singular forms "a", "an", and "the" encompass embodiments having plural referents, unless the context clearly dictates otherwise. As used in this specification and the appended claims, the term "or" is generally employed in its sense including "and/or" unless the context clearly dictates otherwise.

Throughout this disclosure the phrase "contact area" relates to the surface area of a pillar or pillars designed to be in contact with the surface of another substrate, e.g. glass panels of an insulated glass unit (IGU) or vacuum insulated glass unit (VIGU).

Throughout this disclosure the terms, "insulate", "insulating", "insulation", "insulated" and the like, refer to thermally insulating characteristics, unless otherwise noted.

Throughout this disclosure the term, "rounded" means a smooth, continuous curve having a shape that is at least one of a portion of a circle or a portion of an ellipse.

DETAILED DESCRIPTION

The present disclosure relates to pillars useful in the fabrication of insulated glass units, particularly, vacuum insulated glass units. The pillars of the present disclosure have reduced contact area which may be achieved by including structures or channels within the contact area of the pillars. Contact area may also be reduced by reducing the area of contact along the peripheral edge, i.e. the circumference, of the pillar. This may lead to reduced thermal conductivity through the pillars and better overall insulating characteristics of a VIGU containing the pillars. Modifying the peripheral edge of the pillars may also have the added benefit of reducing the stress concentration at the pillar peripheral edge, enabling pillars with both improved mechanical properties and improved thermal conductivity (lower thermal conductivity). The pillars of the present disclosure include a body. The body includes a first surface and an opposed second surface, at least one sidewall, a first peripheral edge adjoining the first surface and the at least one sidewall and a second peripheral adjoining the second surface and the at least one sidewall. The first surface comprises a plurality of first structures; each first structure having a first structure base and a first structure face opposite the base, at least one first void region between the plurality of first structures and a first land surface region located between the plurality of first structures. First land surface region is interconnected with the first structure bases. The pillar bodies may include at least one first channel having first and second ends and a first channel opening proximate the first surface, wherein the at least one first channel is in fluid communication with the local environment through at least one of its first and second ends. The height of the plurality of first structures is less than the depth of the first channel. The first surface and second surface include the contact surfaces of the pillar body. The body may comprise at least one of a continuous, inorganic material or a polymer composite, continuous inorganic materials being particularly useful. A first draft angle, related to an included angle between at least one sidewall and the first surface of the body, is defined. In some embodiments, the first draft angle may be between about 90 degrees and 135 degrees. In some embodiments, the largest dimension of the body parallel to the first surface may be between about 10 microns and about 2000 microns. Several specific, but non-limiting, embodiments are shown in FIGS. 1A and 1B, FIGS. 2A and 2B, FIGS. 3A through 3H, FIG. 5, FIG. 6, FIGS. 7A and 7B, and FIGS. 8A and 8B.

Figure 1B:
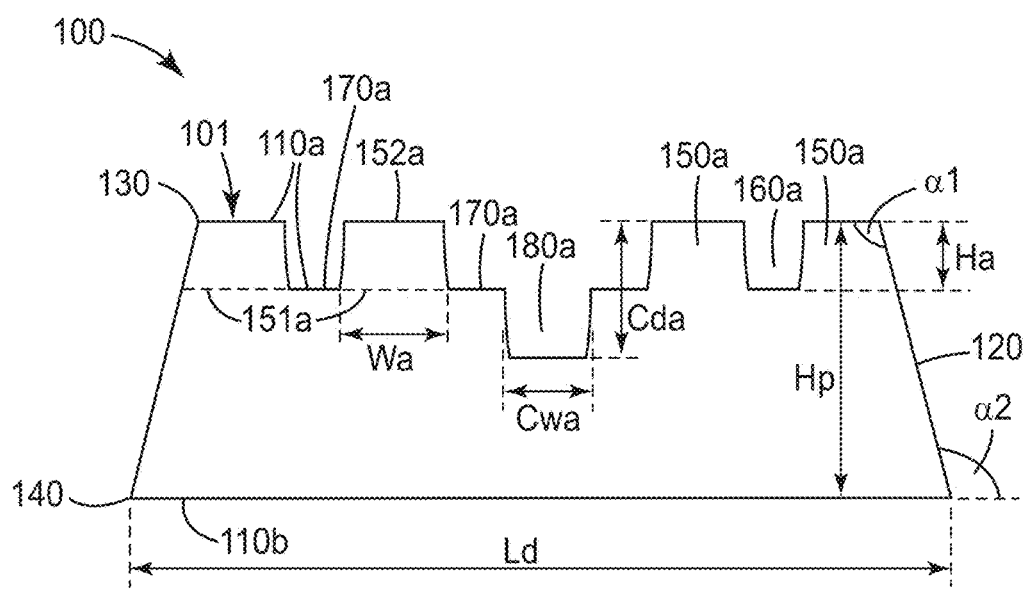
FIG. 1B is a schematic cross-sectional side view along line YY' of the exemplary pillar of FIG. 1A according to one exemplary embodiment of the present disclosure.

Referring now to FIG. 1A, a schematic cross-sectional top view of an exemplary pillar, pillar 100 includes body 101 having a first surface 110a and an opposed second surface 110b (see FIG. 1B), at least one sidewall 120 and a first peripheral edge 130 adjoining the first surface 110a and the at least one sidewall 120. First surface 110a includes a plurality of first structures 150a, at least one first void region 160a between the plurality of first structures and first land surface region 170a. Body 101 further includes first channel, 180a, having first and second ends, 181a and 182a, respectively, and length Cla. The first channel is in fluid communication with the local environment through at least one of its first and second ends, 181a and 182a, respectively. FIG. 1B, a schematic cross-sectional side view along line YY' of the exemplary pillar of FIG. 1A, shows pillar 100 including body 101 having sidewalls 120, peripheral edge 130, first surface 110a and second surface 110b. Also shown is second peripheral edge 140 adjoining second surface 110b and the at least one sidewall 120. Body 101 further includes first channel 180a, having a depth Cda and a width Cwa. The width of a channel, e.g. Cwa, is measured at the channels widest point. Body 101 also includes a plurality of first structures 150a, each first structure includes a first structure base, 151a, shown by the imaginary dashed line and a first structure face, 152a, opposite the base. First land surface region 170a is interconnected with the first structure bases 151a. A first structure face, e.g. 152a, may be referred to as a distal end. Each first structure 150a has a width, Wa, a length La (see FIG. 1A) and a height, Ha. The width, Wa, may be measured at the first structure face 152a. The at least one first void region 160a is in fluid communication with the local environment in a direction parallel to the first surface 110a, i.e. parallel to the first structure faces 152a and/or first land surface region 170a. The at least one first void region 160a has a depth, Dv (not shown) equal to the average height of the plurality of first structures. A first draft angle, $\alpha 1$, is defined as the angle between first surface 110a, e.g. a line parallel to first structure face 152a, and at least one sidewall 120. A second draft angle, $\alpha 2$, is defined as the angle between second surface 110b (as depicted by the horizontal dashed line extended from second surface 110b) and at least one sidewall 120. The first draft angle and the second draft angle may be congruent angles. A dimension, Ld, is defined as the largest dimension of the body parallel to the first surface. The maximum distance from the first surface to the second surface is the height of the pillar, Hp.

Figure 2A:
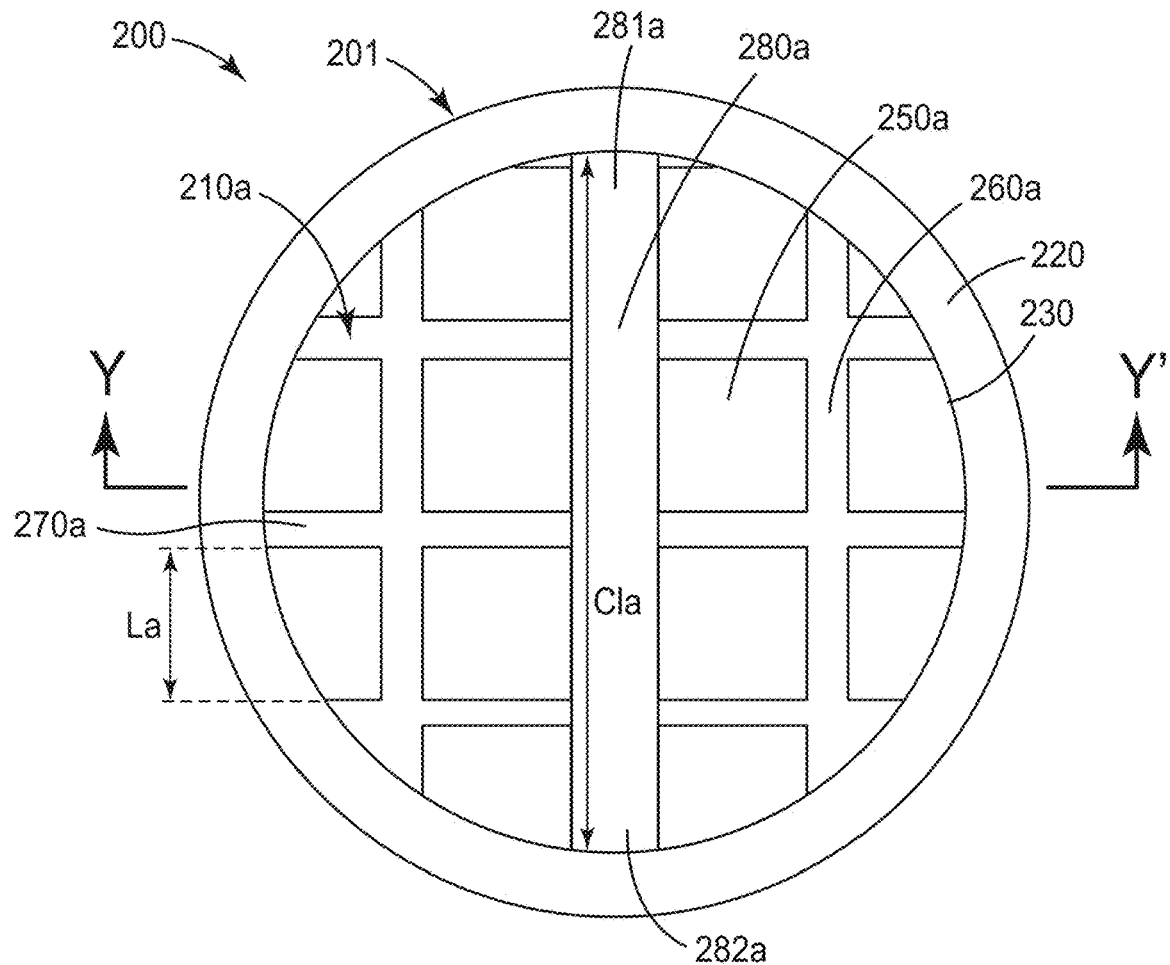
FIG. 2A is a schematic top view of an exemplary pillar according to one exemplary embodiment of the present disclosure.
Figure 2B:
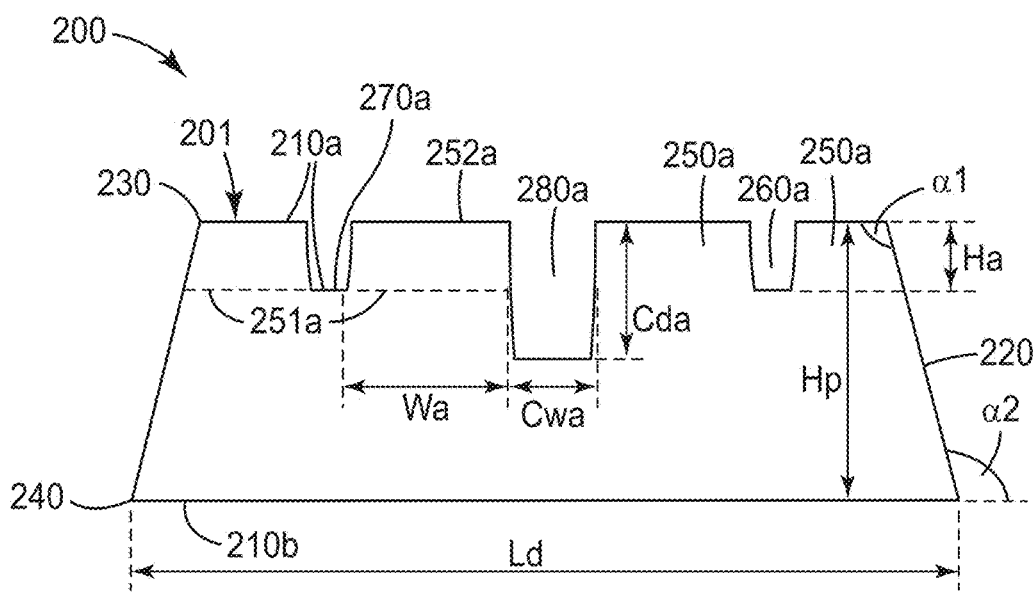
FIG. 2B is a schematic cross-sectional side view along line YY' of the exemplary pillar of FIG. 2A according to one exemplary embodiment of the present disclosure.

Referring now to FIG. 2A, a schematic cross-sectional top view of an exemplary pillar, pillar 200 includes body 201 having a first surface 210a and an opposed second surface 210b (see FIG. 2B), at least one sidewall 220, and a first peripheral edge 230 adjoining the first surface 210a and the at least one sidewall 220. First surface 210a includes a plurality of first structures 250a, at least one first void region 260a between the plurality of first structures and first land surface region 270a. Body 201 further includes first channel, 280a, having first and second ends, 281a and 282a, respectively, and length Cla. The first channel is in fluid communication with the local environment through at least one of its first and second ends, 281a and 282a, respectively. FIG. 2B, a schematic cross-sectional side view along line YY' of the exemplary pillar of FIG. 2A, shows pillar 200 including body 201 having sidewalls 220, peripheral edge 230, first surface 210a and second surface 210b. Also shown is second peripheral edge 240 adjoining second surface 210b and the at least one sidewall 220. Body 201 further includes first channel 280a, having a depth Cda and a width Cwa. The width of the channel, e.g. Cwa, is measured at the channels widest point. Body 201 also includes a plurality of first structures 250a, each first structure includes a first structure base, 251a, shown by the imaginary dashed line and a first structure face, 252a, opposite the base. First land surface region 270a is interconnected with the first structure bases 251a. A first structure face, e.g. 252a, may be referred to as a distal end. Each first structure 250a has a width, Wa, a length La (see FIG. 2A) and a height, Ha. The width, Wa, may be measured at the first structure face 252a. The at least one first void region 260a is in fluid communication with the local environment in a direction parallel to the first surface 210a, i.e. parallel to the first structure faces 252a and/or first land surface region 270a. The at least one first void region 260a has a depth, Dv (not shown) equal to the average height of the plurality of first structures. Ld, Hp, α1 and α2 are as previously described in FIG. 1A. The pillar of FIG. 2A differs from the pillar of FIG. 1A with respect to the placement of the channel. In FIG. 1A, the channel is located in the land region 170a of first surface 110a and the channel wall is independent of first structures 150A. In FIG. 2A, the channel defines one side of a portion of first structures 250a, the sides of the portion of first structures 250a that are directly adjacent to the channel.

Figure 3A:
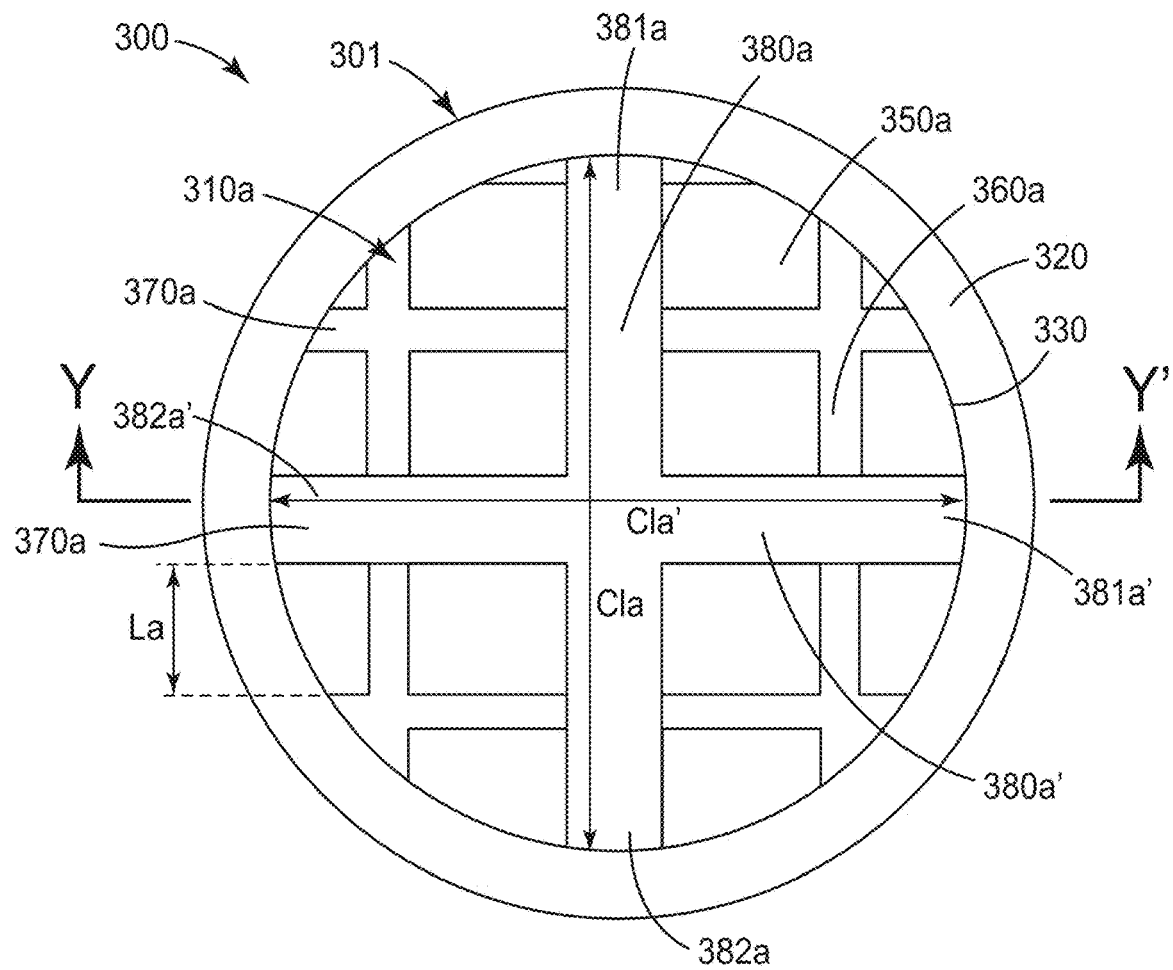
FIG. 3A is a schematic top view of an exemplary pillar according to one exemplary embodiment of the present disclosure.
Figure 3B:
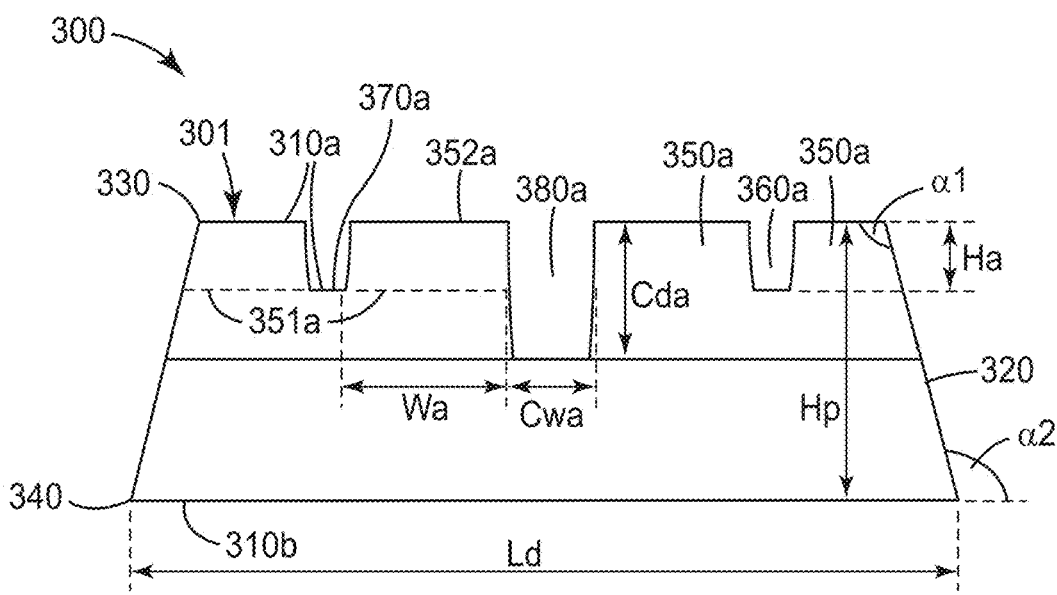
FIG. 3B is a schematic cross-sectional side view along line YY' of the exemplary pillar of FIG. 3A according to one exemplary embodiment of the present disclosure.

Referring now to FIG. 3A, a schematic cross-sectional top view of an exemplary pillar, pillar 300 includes body 301 having a first surface 310a and an opposed second surface 310b (see FIG. 3B), at least one sidewall 320, and a first peripheral edge 330 adjoining the first surface 310a and the at least one sidewall 320. First surface 310a includes a plurality of first structures 350a, at least one first void region 360a between the plurality of first structures and first land surface region 370a. Body 301 further includes first channels, 380a and 380a'. First channel 380a has first ends and second ends, 381a and 382a, respectively, and first channel 380a' has first ends and second ends, 381a' and 382a', respectively. First channels 380a and 380a' have lengths Cla and Cla', respectively. Depending on the general shape of body 301 and the desired length of each channel, the first channel lengths, Cla and Cla' may or may not be the same. The first channels are in fluid communication with the local environment through at least one of their first ends and second ends, 381a, 381a' and 382a, 382a', respectively. FIG. 3B, a schematic cross-sectional side view along line YY' of the exemplary pillar of FIG. 3A, shows pillar 300 including body 301 having sidewalls 320, peripheral edge 330, first surface 310a and second surface 310b. Also shown is second peripheral edge 340 adjoining second surface 310b and the at least one sidewall 320. Body 301 further includes first channel 380a, having a depth Cda and a width Cwa. Although not shown, first channel 380a' would have a corresponding depth Cda' and a width Cwa'. The width of a channel, e.g. Cwa and Cwa', is measured at the channels widest point. Depending on the desired width of each channel, the first channel widths, Cwa and Cwa' may or may not be the same. Depending on the desired depth of each channel, the first channel depths, Cda and Cda' may or may not be the same. Body 301 also includes a plurality of first structures 350a, each first structure includes a first structure base, 351a, shown by the imaginary dashed line and a first structure face, 352a, opposite the base. First land surface region 370a is interconnected with the first structure bases 351a. A first structure face, e.g. 352a, may be referred to as a distal end. Each first structure 350a has a width, Wa, a length La (see FIG. 3A) and a height, Ha. The width, Wa, may be measured at the first structure face 352a. The at least one first void region 360a is in fluid communication with the local environment in a direction parallel to the first surface 310a, i.e. parallel to the first structure faces 352a and/or first land surface region 370a. The at least one first void region 360a has a depth, Dv (not shown) equal to the average height of the plurality of first structures. Ld, Hp, α1 and α2 are as previously described in FIG. 1A.

Figure 3C:
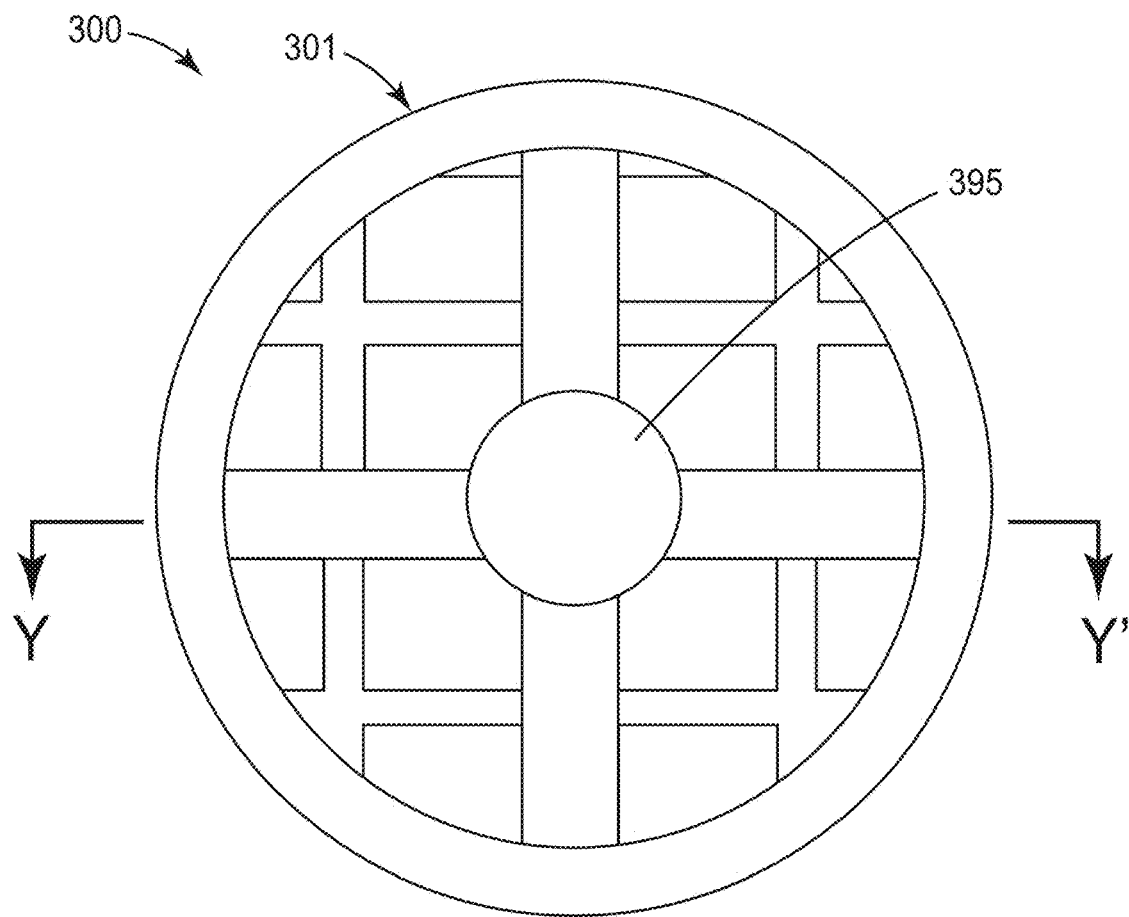
FIG. 3C is a schematic top view of an alternative embodiment of the exemplary pillar of FIG. 3A according to one exemplary embodiment of the present disclosure.

In some embodiments, the pillar body of the present disclosure may include at least one through hole. Referring now to FIG. 3C, a schematic top view of an alternative embodiment of the exemplary pillar of FIG. 3A, pillar 300 and body 301 are as described in FIG. 3A, the body 301 further includes a through hole 395. The through hole, by definition, runs through the entire height of the pillar. The through hole may or may not be centered in the pillar body. The through hole shape may coincide with the general shape of the pillar body, in this exemplary embodiment both are circular in shape, however the through hole shape may be different from that of the shape of the pillar body. The shape of the through hole is not particularly limited. The shape of the through hole includes, but is not limited to, circular, ellipse, triangular, square, rectangular, hexagonal, octagonal and the like.

Figure 3D:
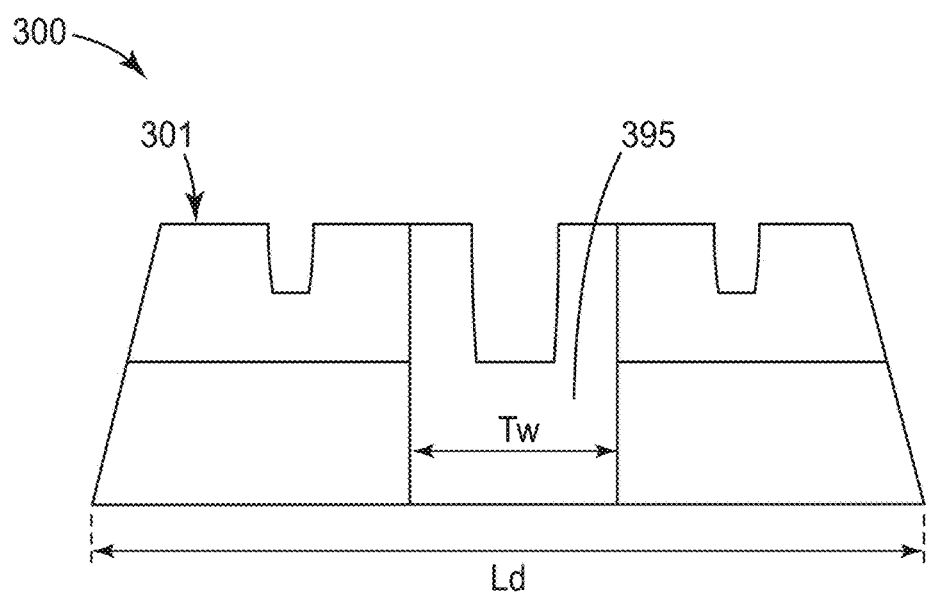
FIG. 3D is a schematic cross-sectional side view along line YY' of the exemplary pillar of FIG. 3C according to one exemplary embodiment of the present disclosure.

FIG. 3D, a schematic cross-sectional side view along line YY' of the exemplary pillar of FIG. 3C, shows pillar 300 including body 301 with through hole 395. A dimension, Tw, is defined as the largest dimension of the through hole parallel to the first surface. Ld is as previously described in FIG. 1A. The ratio of Tw/Ld may be between about 0.05 and about 0.95, between about 0.10 and about 0.95, between about 0.20 and about 0.95, between about 0.30 and about 0.95, between about 0.05 and about 0.90, between about 0.10 and about 0.90, between about 0.20 and about 0.90, between about 0.30 and about 0.90, between about 0.05 and about 0.80, between about 0.10 and about 0.95, between about 0.20 and about 0.80, between about 0.30 and about 0.80, between about 0.05 and about 0.70, between about 0.10 and about 0.70, between about 0.20 and about 0.70, or even between about 0.30 and about 0.70. The number of through holes is not particularly limited and may be between about 1 and about 20, between about 1 and about 10 or even between about one and about 5.

Although the above discussion focused on the first surface of the pillar body, in some embodiments, the pillar bodies of the present disclosure may further include at least a plurality of second structures and at least one second channel having first and second ends and a second channel opening proximate the second surface. Each second structure has a second structure base and a second structure face opposite the base, at least one second void region between the plurality of second structures and a second land surface region located between the plurality of second structures, the second land surface region interconnected with the second structure bases. The second channel is in fluid communication with the local environment through at least one of its first and second ends. The at least one second void region is in fluid communication with at least one of the local environment in a direction parallel to the first surface and the at least one second channel. The height of the plurality of second structures is less than the depth of the channel.

Figure 3E:
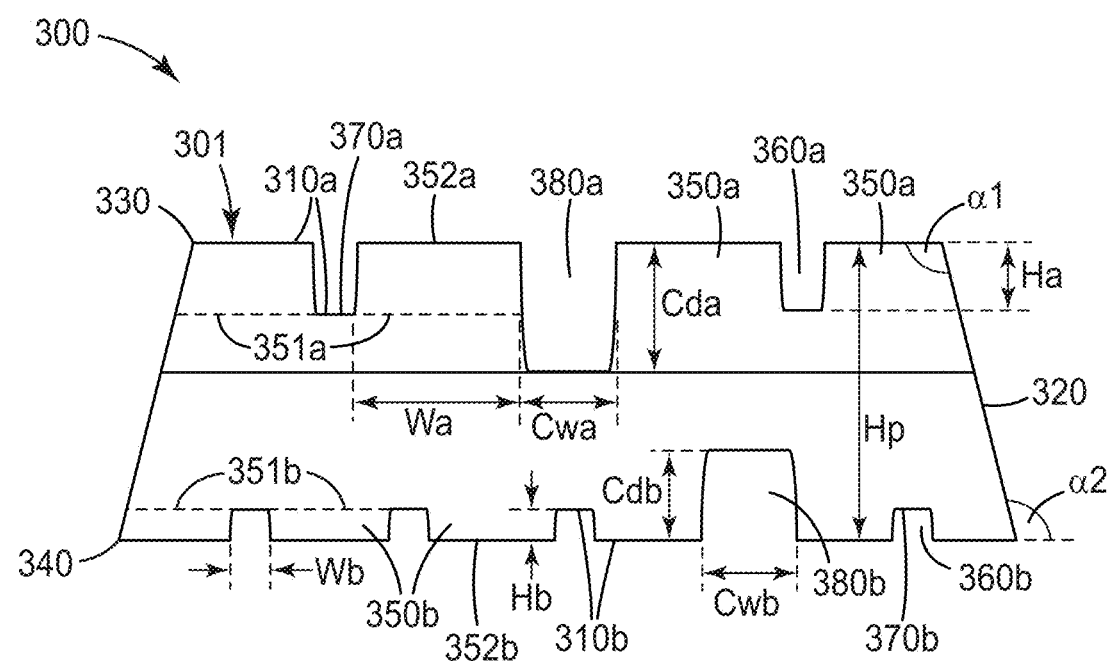
FIG. 3E is a schematic cross-sectional side view along line YY' of an alternative embodiment of the exemplary pillar of FIGS. 3A and 3B according to one exemplary embodiment of the present disclosure.

Referring to FIG. 3E, a schematic cross-sectional side view along line YY' of an alternative embodiment of the exemplary pillar of FIGS. 3A and 3B according to one exemplary embodiment of the present disclosure, a pillar 300 has a body 301 including a first surface 310a which includes a plurality of first structures 350a, having first structure bases 351a and first structure faces 352a, at least one first void region 360a between the plurality of first structures 350a and first land surface region 370a, the first land surface region 370a interconnected with the first structure bases 351a. The pillar 300 further includes a second surface 310b, having a plurality of second structures 350b. Plurality of second structures 350b have second structure bases 351b and second structure faces 352b. Second surface 310b also includes at least one second void region 360b between the plurality of second structures 350b and second land surface region 370b, the second land surface region 370b interconnected with the second structure bases 351b. A second structure face 352b may be referred to as a distal end. Each second structure 350b has a width, Wb, a length Lb (not shown, but defined similarly as that of La of FIG. 3A) and a height, Hb. Also shown is first peripheral edge 340 adjoining first surface 110a and the at least one sidewall 320 and a second peripheral edge 340 adjoining second surface 310b and the at least one sidewall 320. Addition of the plurality of structures to the first surface and/or second surface of the pillar body reduces the overall contact surface of the pillar body, as the area of the first structure faces and/or second structure faces now represents the contact area for the pillar body. Some of the first structures and/or second structures may be at or near to the peripheral edge such that they are part of the peripheral edge and, thus, may have a chamfered or rounded edge, further details of which will be provided. These design features may lead to reduced thermal conductivity, i.e. improved insulating capabilities, or mechanical properties of the pillars of the present disclosure.

The second surface 310b, may also include at least one second channel, 380b, having first and second ends, 381b and 382b, respectively. The at least one second channel has a depth Cdb, a length Clb (not shown, but defined similarly as that of Cla of FIG. 3A) and a width Cwb. The at least one second channel is in fluid communication with the local environment through at least one of its first and second ends, 381b and 382b, respectively (not shown, but similarly defined similarly as that of 381a and 382a of FIG. 3A). Ld is not shown, but is as defined in FIG. 3B. Addition of at least one channel to the first surface and/or second surface of the pillar body reduces the overall contact surface of the pillar body, as the area of the first surface 310a and/or second surface 310b are reduced by the inclusion of the at least one channel. This design feature may lead to reduced thermal conductivity, i.e. improved insulating capabilities, of the pillars of the present disclosure. If, for example, the body is in the shape of an annulus, inclusion of at least one first channel may aid in the evacuation of gas from interior of the annulus, when the pillar is used in a VIGU.

The previous figures have shown a circular shaped pillar with a single sidewall. However, the number of sidewalls of the pillar body is not particularly limited. The body may have one, continuous side wall, as would be obtained if the shape of the body is cylindrical, elliptical cylindrical or spiral. In some embodiments, the body may have a plurality of sidewalls. In some embodiments, the plurality of sidewalls includes between 3 to 30 sidewalls, between 3 to 20 sidewalls, between 3 to 12 sidewalls, between 4 to 30 sidewalls, between 4 to 20 sidewalls, between 4 to 12 sidewalls, between 5 to 30 sidewalls, between 5 to 20 sidewalls, between 5 to 12 sidewalls, between 5 to 30 sidewalls, between 5 to 20 sidewalls, between 5 to 12 sidewalls, 6 to 30 sidewalls, from between 6 to 20 sidewalls, or even between 6 to 12 sidewalls.

When the body has a plurality of sidewalls, each sidewall has a first draft angle, $\alpha 1$, and a second draft angle, $\alpha 2$. The first draft angle, $\alpha 1$, for each sidewall is defined as the included angle between the first surface and the adjoining sidewall (as depicted in FIGS. 1B, 2B and 3B). The second draft angle, $\alpha 2$, for each sidewall, is defined as the angle between the second surface (as depicted by the horizontal dashed line extended from the second surface if FIGS. 1B, 2B and 3B) and the adjoining sidewall. The first draft angle and the second draft angle may be congruent angles. In some embodiments, $\alpha 1$ and/or $\alpha 2$, may be between about 90 degrees and about 135 degrees, between about 95 degrees and about 135 degrees, between about 100 degrees and about 135 degrees, 90 degrees and about 130 degrees, between about 95 degrees and about 130 degrees, between about 100 degrees and about 130 degrees, 90 degrees and about 120 degrees, between about 95 degrees and about 120 degrees, between about 100 degrees and about 120 degrees, 90 degrees and about 110 degrees, between about 95 degrees and about 110 degrees, or even between about 100 degrees and about 110 degrees. If $\alpha 1$ is greater than 90 degrees, the associated sidewall will be a tapered sidewall and the second surface is defined as having the larger projected surface area and the second surface may be adjacent or proximate Ld.

The height of the pillar, Hp, is not particularly limited. In some embodiments, the height of the pillar may be between about 10 micron and about 2000 microns, between about 10 microns and about 1500 microns, between about 10 microns and about 1250 microns, between about 10 microns and about 1000 microns, between about 10 microns and about 750 microns, between about 10 microns and about 500 microns, between about 50 micron and about 2000 microns, between about 50 microns and about 1500 microns, between about 50 microns and about 1250 microns, between about 50 microns and about 1000 microns, between about 50 microns and about 750 microns, between about 50 microns and about 500 microns, 100 micron and about 2000 microns, between about 100 microns and about 1500 microns, between about 100 microns and about 1250 microns, between about 100 microns and about 1000 microns, between about 100 microns and about 750 microns, between about 100 microns and about 500 microns.

Ld, has been defined as the largest dimension of the body parallel to the first surface. In some embodiments, Ld may be between about 10 micron and about 2000 microns, between about 10 microns and about 1500 microns, between about 10 microns and about 1250 microns, between about 10 microns and about 1000 microns, between about 10 microns and about 750 microns, between about 10 microns and about 500 microns, between about 50 micron and about 2000 microns, between about 50 microns and about 1500 microns, between about 50 microns and about 1250 microns, between about 50 microns and about 1000 microns, between about 50 microns and about 750 microns, between about 50 microns and about 500 microns, 100 micron and about 2000 microns, between about 100 microns and about 1500 microns, between about 100 microns and about 1250 microns, between about 100 microns and about 1000 microns, between about 100 microns and about 750 microns, between about 100 microns and about 500 microns.

The shape of the pillar body is not particularly limited and may include, but is not limited to; circular cylindrical; elliptical cylindrical; polygonal prisms, e.g. pentagonal prism, hexagonal prism and octagonal prism; pyramidal and truncated pyramidal, wherein the pyramidal shape may include between 3 to 30 sidewalls; cuboidal, e.g. square cube or rectangular cuboid; conical; truncated conical, annular, spiral and the like. If the pillar shape is annular, the annulus shape is not particularly limited and may include, but is not limited to, circular cylindrical; elliptical cylindrical; polygonal prisms, e.g. pentagonal prism, hexagonal prism and octagonal prism; truncated pyramidal, wherein the pyramidal shape may include between 3 to 30 sidewalls; cuboidal, e.g. square cube or rectangular cuboid; truncated conical and the like. The shape of the annulus through hole may be the same as the shape of the annulus or may be different, said shapes not particularly limited and include those described for the annulus. The through hole shape could also be an indicia, e.g. numbers, letters, words and the like.

The shape of the plurality of first structures and/or the plurality of second structures may all be the same or combinations may be used. In some embodiments, at least about 10%, at least about 30%, at least about 50%, at least about 70%, at least about 90%, at least about 95%, at least about 97%, at least about 99% or even at least about 100% of the first and/or second structures are designed to have the same shape and dimensions. The plurality of first structures and second structures are typically made by a precision fabrication processes, e. g. molding and embossing, and the tolerances are, generally, small. For a plurality of structures designed to have the same structure dimensions, the structure dimensions are uniform. In some embodiments, the percent non-uniformity of at least one distance dimension corresponding to the size of the plurality of first and/or second structures, e.g. length, height, width of the face or width at the base is less than about 20%, less than about 15%, less than about 10%, less than about 8%, less than about 6% less than about 4%, less than about 3%, less than about 2%, less than about 1.5% or even less than about 1%. The percent non-uniformity is the standard deviation of a set of values divided by the average of the set of values multiplied by 100. The standard deviation and average can be measured by known statistical techniques. The standard deviation may be calculated from a sample size of at least 5 structures, at least 10 structures, at least 15 structures or even at least 20 structures, or even more. The sample size may be no greater than 200 structures, no greater than 100 structures or even no greater than 50 structures. The sample may be selected randomly from a single region on the body or from multiple regions on the body.

In some embodiments, the body of the pillar is a precisely shaped body. "Precisely shaped" refers to a body, having a molded shape that is the inverse shape of a corresponding mold cavity, said shape being retained after the body is removed from the mold. A precisely shaped body may still be considered precisely shaped, even though it may undergo some shrinkage related to curing, drying or other thermal treatments, e.g. calcinting or sintering, as it retains the general shape of the mole cavity from which it was original produced.

In some embodiments, at least about 50%, at least about 70%, at least about 90%, at least about 95%, at least about 97%, at least about 99% and even at least about 100% of the first and/or second structures are solid structures. A solid structure is defined as a structure that contains less than about 2%, less than about 1%, less than about 0.5%, less than about 0.1%, less than about 0.05%, less than about 0.025% or even 0% porosity by volume.

In some embodiments, the length of the first and/or second structures, i.e. the longest dimension, with respect to the cross-sectional area of the first and or second structures in a plane parallel to the first and/or second surface, respectively, may be between about 10 micron and about 2000 microns, between about 10 microns and about 1500 microns, between about 10 microns and about 1250 microns, between about 10 microns and about 1000 microns, between about 10 microns and about 750 microns, between about 10 microns and about 500 microns, between about 50 micron and about 2000 microns, between about 50 microns and about 1500 microns, between about 50 microns and about 1250 microns, between about 50 microns and about 1000 microns, between about 50 microns and about 750 microns, between about 50 microns and about 500 microns, 100 micron and about 2000 microns, between about 100 microns and about 1500 microns, between about 100 microns and about 1250 microns, between about 100 microns and about 1000 microns, between about 100 microns and about 750 microns, between about 100 microns and about 500 microns. The plurality of first and/or second structures may all have the same longest dimensions or the longest dimension may vary, per design.

In some embodiments, the width of each first and/or second structure may be between about 10 microns and about 1500 microns, between about 10 microns and about 1250 microns, between about 10 microns and about 1000 microns, between about 10 microns and about 750 microns, between about 10 microns and about 500 microns, between about 10 microns and about 250 microns, between about 50 microns and about 1500 microns, between about 50 microns and about 1250 microns, between about 50 microns and about 1000 microns, between about 50 microns and about 750 microns, between about 50 microns and about 500 microns, between about 50 microns and about 250 microns, between about 100 microns and about 1500 microns, between about 100 microns and about 1250 microns, between about 100 microns and about 1000 microns, between about 100 microns and about 750 microns, between about 100 microns and about 500 microns, or even between about 100 microns and about 250 microns. The plurality of first and/or second structures may all have the same width or the widths may vary, per design. If a structure has a tapered sidewall, the width of the structure may be taken at the distal end, i.e. the structure, e.g. 352*a* and 352*b*.

In some embodiments, the height of each first and/or second structure may be between about 1 micron and about 500 microns, between about 1 micron and about 250 microns, between about 1 microns and about 100 microns, between about 1 microns and about 50 microns, between about 5 microns and about 500 microns, between about 5 microns and about 250 microns, between about 5 microns and about 100 microns, between about 5 microns and about 50 microns, between about 10 microns and about 500 microns, between about 10 microns and about 250 microns, between about 10 microns and about 100 microns between about 10 microns and about 50 microns, between about 15 microns and about 500 microns, between about 15 microns and about 250 microns, between about 15 micron and about 100 microns, between about 15 micron and about 50 microns, between about 20 microns and about 500 microns, between about 20 microns and about 250 microns, between about 20 micron and about 100 microns, or even between about 20 micron and about 50 microns. The plurality of first and/or second structures may all have the same heights or the heights may vary, per design. In some embodiments, the percent non-uniformity of the height of a plurality of first structures and/or a plurality of second structures may be between about 0.01 percent and about 10 percent, between about 0.01 percent and 7 percent, between about 0.01 percent and about 5 percent, between about 0.01 percent and 4 percent, between about 0.01 percent and 3 percent, between about 0.01 percent and 2 percent or even between about 0.01 percent and 1 percent.

In some embodiment, the height of at least about 10%, at least about 30% at least about 50%, at least 70%, at least about 80%, at least about 90%, at least about 95% or even at least about 100% of the first and/or second structures may be between about 1 micron and about 500 microns, between about 1 micron and about 250 microns, between about 1 microns and about 100 microns, between about 1 microns and about 50 microns, between about 5 microns and about 500 microns, between about 5 microns and about 250 microns, between about 5 microns and about 100 microns, between about 5 microns and about 50 microns, between about 10 microns and about 500 microns, between about 10 microns and about 250 microns, between about 10 microns and about 100 microns between about 10 microns and about 50 microns, between about 15 microns and about 500 microns, between about 15 microns and about 250 microns, between about 15 micron and about 100 microns, between about 15 micron and about 50 microns, between about 20 microns and about 500 microns, between about 20 microns and about 250 microns, between about 20 micron and about 100 microns, or even between about 20 micron and about 50 microns.

In some embodiments, the ratio of Ha/Hp and/or the ratio of the height of Hb/Hp may be between about 0.01 to about 0.50, between about 0.03 and about 0.50, between about 0.05 and 0.50, between about 0.01 to about 0.40, between about 0.03 and about 0.40, between about 0.05 and 0.40, between about 0.01 to about 0.30, between about 0.03 and about 0.30, between about 0.05 and 0.30, between about 0.01 to about 0.20, between about 0.03 and about 0.20, between about 0.05 and 0.20, between about 0.01 to about 0.15, between about 0.03 and about 0.15, between about 0.05 and 0.15, between about 0.01 to about 0.10, between about 0.03 and about 0.10, or even between about 0.05 and 0.10.

In some embodiments, the plurality of first and/or second structures may be uniformly distributed, i.e. have a single areal density, across the first surface of the body and second surface of the body, respectively, or may have different areal density across the first surface of the body and second surface of the body, respectively. In some embodiments, the areal density of the plurality of first and or second structures may be between about $10/mm^2$ to about $100000/mm^2$, between about $10/mm^2$ to about $75000/mm^2$, between about $10/mm^2$ to about $50000/mm^2$, between about $10/mm^2$ to about $30000/mm^2$, between about $50/mm^2$ to about $100000/mm^2$, between about $50/mm^2$ to about $750000/mm^2$, between about $50/mm^2$ to about $50000/mm^2$, between about $50/mm^2$ to about $30000/mm^2$, between about $100/mm^2$ to about $100000/mm^2$, between about $100/mm^2$ to about $75000/mm^2$, between about $100/mm^2$ to about $50000/mm^2$, or even between about $100/mm^2$ to about $30,000/mm^2$.

The plurality of first and/or second structures may be arranged randomly across the first and/or second surface, respectively, or may be arranged in a pattern, e.g. a repeating pattern, across the first and/or second surface, respectively. Patterns include, but are not limited to, square arrays, hexagonal arrays and the like. Combination of patterns may be used.

Similar to the body of a pillar, draft angles α1' and α2' can be defined for the sidewalls of the plurality of first and second structures. The range in values of draft angles α1' and α2' are the same as those disclosed for draft angles α1 and α2.

In some embodiments, the ratio of the total area of the plurality of first structure faces, i.e. the sum of the area of the face of each structure, to the projected area of the first surface may be between about 0.10 to about 0.98, between about 0.10 to about 0.95, between about 0.10 to about 0.90, between about 0.10 and about 0.80, between about 0.01 and about 0.70, between about 0.20 to about 0.98, between about 0.20 to about 0.95, between about 0.20 to about 0.90, between about 0.20 and about 0.80, between about 0.20 and about 0.70, between about 0.30 to about 0.98, between about 0.30 to about 0.95, between about 0.30 to about 0.90, between about 0.30 and about 0.80, between about 0.30 and about 0.70, between about 0.40 to about 0.98, between about 0.40 to about 0.95, between about 0.40 to about 0.90, between about 0.40 and about 0.80, between about 0.40 and about 0.70, between about 0.50 to about 0.98, between about 0.50 to about 0.95, between about 0.10 to about 0.90, between about 0.50 and about 0.80, or even between about 0.50 and about 0.70. As an example of this ratio, as shown in FIG. 1A, the total area of the plurality of first structure faces is the sum of the area of each individual first structure face 152a and the total projected area of the first surface is the smaller circle shown in FIG. 1A. The smaller circle in FIG. 1A is equivalent to the projected surface area of first surface 110a and that projected surface area includes the area of the first structure faces 152a, the area of first land surface region 170a and the area of channel 180a. In calculating the area of the first surface and the second surface, the chamfered peripheral edge and rounded peripheral edge are not included, if present.

In some embodiments, the ratio of the total area of the plurality of second structure faces, i.e. the sum of the area of the face of each structure, to the projected area of the second surface may be between about 0.10 to about 0.98, between about 0.10 to about 0.95, between about 0.10 to about 0.90, between about 0.10 and about 0.80, between about 0.01 and about 0.70, between about 0.20 to about 0.98, between about 0.20 to about 0.95, between about 0.20 to about 0.90, between about 0.20 and about 0.80, between about 0.20 and about 0.70, between about 0.30 to about 0.98, between about 0.30 to about 0.95, between about 0.30 to about 0.90, between about 0.30 and about 0.80, between about 0.30 and about 0.70, between about 0.40 to about 0.98, between about 0.40 to about 0.95, between about 0.40 to about 0.90, between about 0.40 and about 0.80, between about 0.40 and about 0.70, between about 0.50 to about 0.98, between about 0.50 to about 0.95, between about 0.10 to about 0.90, between about 0.50 and about 0.80, or even between about 0.50 and about 0.70.

The number of the at least one first channel and/or the at least one second channel is not particularly limited. In some embodiments, the number of first channels and/or the number of second channels may be between 1 and 50, between 1 and 35, between 1 and 20, between 1 and 15, between 1 and 10, between 2 and 50, between 2 and 35, between 2 and 20, between 2 and 15, between 2 and 10, between 3 and 50, between 3 and 35, between 3 and 20, between 3 and 15 or even between 3 and 10.

The cross-sectional shape of the at least one first channel and/or the at least one second channel is not particularly limited and includes, but is not limited to, square, rectangular, triangular (v-shaped), truncated triangular, and the like. The at least one first and/or second channel may be linear along its length, i.e. a line, arced, curved, wavy, sinusoidal and the like. If more than one first channel is present, the first channels may intersect or may not intersect, e.g. parallel first channels. If more than one second channel is present, the second channels may intersect or may not intersect, e.g. parallel channels.

The shape of the first and/or second channels may all be the same or combinations may be used. In some embodiments, at least about 10%, at least about 30%, at least about 50%, at least about 70%, at least about 90%, at least about 95%, at least about 97%, at least about 99% or even at least about 100% of the at least one first channel and/or the at least one second channel are designed to have the same shape and dimensions. The channels are typically made by a precision fabrication processes, e. g. molding and embossing, and the tolerances are, generally, small. For a plurality of channels designed to have the same channel dimensions, the channel dimensions are uniform. In some embodiments, the percent non-uniformity of at least one dimension corresponding to the size of the first channels and/or second channels, e.g. length, depth, width is less than about 20%, less than about 15%, less than about 10%, less than about 8%, less than about 6% less than about 4%, less than about 3%, less than about 2%, less than about 1.5% or even less than about 1%. The percent non-uniformity may be calculated as previously described.

In some embodiments, the length of the at least one first channel and/or the at least one second channel, i.e. the longest dimension, respectively, may be between about 10 micron and about 2000 microns, between about 10 microns and about 1500 microns, between about 10 microns and about 1250 microns, between about 10 microns and about 1000 microns, between about 10 microns and about 750 microns, between about 10 microns and about 500 microns, between about 50 micron and about 2000 microns, between about 50 microns and about 1500 microns, between about 50 microns and about 1250 microns, between about 50 microns and about 1000 microns, between about 50 microns and about 750 microns, between about 50 microns and about 500 microns, 100 micron and about 2000 microns, between about 100 microns and about 1500 microns, between about 100 microns and about 1250 microns, between about 100 microns and about 1000 microns, between about 100 microns and about 750 microns, between about 100 microns and about 500 microns. The plurality of first and/or second structures may all have the same longest dimensions or the longest dimension may vary, per design.

In some embodiments, the width of the at least one first channel and/or the at least one second channel may be between about 1 microns and about 1000 microns, between about 1 microns and about 750 microns, between about 1 microns and about 500 microns, between about 1 microns and about 300 microns, between about 1 microns and about 200 microns, between about 1 microns and about 100 microns, 5 microns and about 1000 microns, between about 5 microns and about 750 microns, between about 5 microns and about 500 microns, between about 5 microns and about 300 microns, between about 5 microns and about 200 microns, between about 5 microns and about 100 microns, between about 10 microns and about 1000 microns, between about 10 microns and about 750 microns, between about 10 microns and about 500 microns, between about 10 microns and about 300 microns, between about 10 microns and about 200 microns, between about 10 microns and about 100 microns, between about 20 microns and about 1000 microns, between about 20 microns and about 750 microns, between about 20 microns and about 500 microns, between about 20 microns and about 300 microns, between about 20 microns and about 200 microns, between about 20 microns and about 100 microns, between about 35 microns and about 1000 microns, between about 10 microns and about 750 microns, between about 35 microns and about 500 microns, between about 35 microns and about 300 microns, between about 35 microns and about 200 microns, between about 35 microns and about 100 microns, between about 50 microns and about 1000 microns, between about 50 microns and about 750 microns, between about 50 microns and about 500 microns, between about 50 microns and about 300 microns, between about 50 microns and about 200 microns, or even between about 50 microns and about 100 microns.

In some embodiments, the depth of the at least one first channel and/or the at least one second channel may be between about 1 micron and about 1000 microns, 1 micron and about 500 microns, between about 1 micron and about 250 microns, between about 1 microns and about 100 microns, between about 5 microns and about 1000 microns, between about 5 microns and about 500 microns, between about 5 microns and about 250 microns, between about 5 microns and about 100 microns, between about 10 microns and about 1000 microns, between about 10 microns and about 500 microns, 10 microns and about 500 microns, between about 10 microns and about 250 microns, between about 10 microns and about 100 microns between about 15 microns and about 1000 microns, between about 15 microns and about 500 microns, 15 microns and about 500 microns, between about 15 microns and about 250 microns, between about 15 micron and about 100 microns, between about 20 micron and about 1000 microns, between about 20 microns and about 500 microns, 20 microns and about 500 microns, between about 20 microns and about 250 microns, or even between about 20 micron and about 100 microns. If more than one first channel is present, the first channels may have the same depths or the depths may vary, per design. If more than one second channel is present, the second channels may have the same depths or the depths may vary, per design. In some embodiments, the percent non-uniformity of the depth of a plurality of first channels and/or a plurality of second channels may be between about 0.01 percent and about 10 percent, between about 0.01 percent and 7 percent, between about 0.01 percent and about 5 percent, between about 0.01 percent and 4 percent, between about 0.01 percent and 3 percent, between about 0.01 percent and 2 percent or even between about 0.01 percent and 1 percent.

In some embodiment, the depth of at least about 10%, at least about 30% at least about 50%, at least 70%, at least about 80%, at least about 90%, at least about 95% or even at least about 100% of the first channels and/or second channels may be between about 1 micron and about 1000 microns, 1 micron and about 500 microns, between about 1 micron and about 250 microns, between about 1 microns and about 100 microns, between about 5 microns and about 1000 microns, between about 5 microns and about 500 microns, between about 5 microns and about 250 microns, between about 5 microns and about 100 microns, between about 10 microns and about 1000 microns, between about 10 microns and about 500 microns, 10 microns and about 500 microns, between about 10 microns and about 250 microns, between about 10 microns and about 100 microns between about 15 microns and about 1000 microns, between about 15 microns and about 500 microns, 15 microns and about 500 microns, between about 15 microns and about 250 microns, between about 15 micron and about 100 microns, between about 20 micron and about 1000 microns, between about 20 microns and about 500 microns, 20 microns and about 500 microns, between about 20 microns and about 250 microns, or even between about 20 micron and about 100 microns.

In some embodiments, the ratio of Cda/Hp and/or the ratio of Cdb/Hp may be between about 0.01 and about 0.50, between about 0.05 to about 0.50, between about 0.10 and about 0.50, between about 0.15 and 0.50, between about 0.20 and 0.50, between about 0.01 and about 0.40, between about 0.05 to about 0.40, between about 0.10 and about 0.40, between about 0.15 and 0.40, between about 0.20 and 0.40, between about 0.01 and about 0.30, between about 0.05 to about 0.30, between about 0.10 and about 0.30, between about 0.15 and 0.30, or even between about 0.20 and 0.30.

In some embodiments, the ratio of the height of the structures to the depth of the channel, e.g. Ha/Cda, and Ha/Cdb, may be between about 0.01 and about 0.9, between about 0.05 to about 0.9, between about 0.1 and about 0.9, between about 0.2 and 0.9, between about 0.01 and about 0.8, between about 0.05 to about 0.8, between about 0.1 and about 0.8, between about 0.2 and 0.8, between about 0.01 and about 0.7, between about 0.05 to about 0.7, between about 0.10 and about 0.7, or even between about 0.20 and 0.7.

Similar to the body of a pillar, draft angles $\alpha1''$ and $\alpha2''$ can be defined for the sidewalls of the plurality of at least one first channel and at least one second channel. The values of draft angles $\alpha1''$ and $\alpha2''$ are the same as those disclosed for draft angles $\alpha1$ and $\alpha2$.

In some embodiments, the ratio of the area of the at least one first channel, in the plane of the first surface, to the area of the first surface may be between about 0.02 to about 0.50, between about 0.02 to about 0.40, between about 0.02 to about 0.30, between about 0.02 and about 0.20, between about 0.05 to about 0.50, between about 0.05 to about 0.40, between about 0.05 to about 0.30, between about 0.05 and about 0.20, between about 0.10 to about 0.50, between about 0.10 to about 0.40, between about 0.10 to about 0.30, between about 010 and about 0.20, between about 0.15 to about 0.50, between about 0.015 to about 0.40, between about 0.15 to about 0.30, or even between about 0.15 and about 0.20. In some embodiments, the ratio of the area of the at least one second channel, in the plane of the second surface, to the area of the second surface may be between about 0.02 to about 0.50, between about 0.02 to about 0.40, between about 0.02 to about 0.30, between about 0.02 and about 0.20, between about 0.05 to about 0.50, between about 0.05 to about 0.40, between about 0.05 to about 0.30, between about 0.05 and about 0.20, between about 0.10 to about 0.50, between about 0.10 to about 0.40, between about 0.10 to about 0.30, between about 010 and about 0.20, between about 0.15 to about 0.50, between about 0.015 to about 0.40, between about 0.15 to about 0.30, or even between about 0.15 and about 0.20. In calculating the area of the first surface and the second surface, the chamfered peripheral edge and rounded peripheral edge are not included, if present.

The pillar bodies of the present disclosure include a first and second opposed peripheral edge. In some embodiments, at least a portion of the first peripheral edge is at least one of rounded and chamfered. Pillars having bodies which include rounded and/or chamfered peripheral edges are discussed in commonly assigned U.S. Patent Application Ser. No. 62/132,054, entitled "VACUUM GALZING PILLARS FOR INSULATED GLASS UNITS AND INSULATED GLASS UNITS THEREFROM", filed on an even date herewith, which is hereby incorporated herein by reference in its entirety. In other embodiments, the entire first peripheral edge is at least one of rounded and chamfered. In some embodiments, at least a portion of the second peripheral edge is at least one of rounded and chamfered. In other embodiments, the entire second peripheral edge is at least one of rounded and chamfered. In some embodiments at least a portion of the first peripheral edge and at least a portion of the second peripheral edge is at least one of rounded or chamfered. By "entire first peripheral edge", it is meant the peripheral edge along the entire circumference of the body.

Figure 3F:
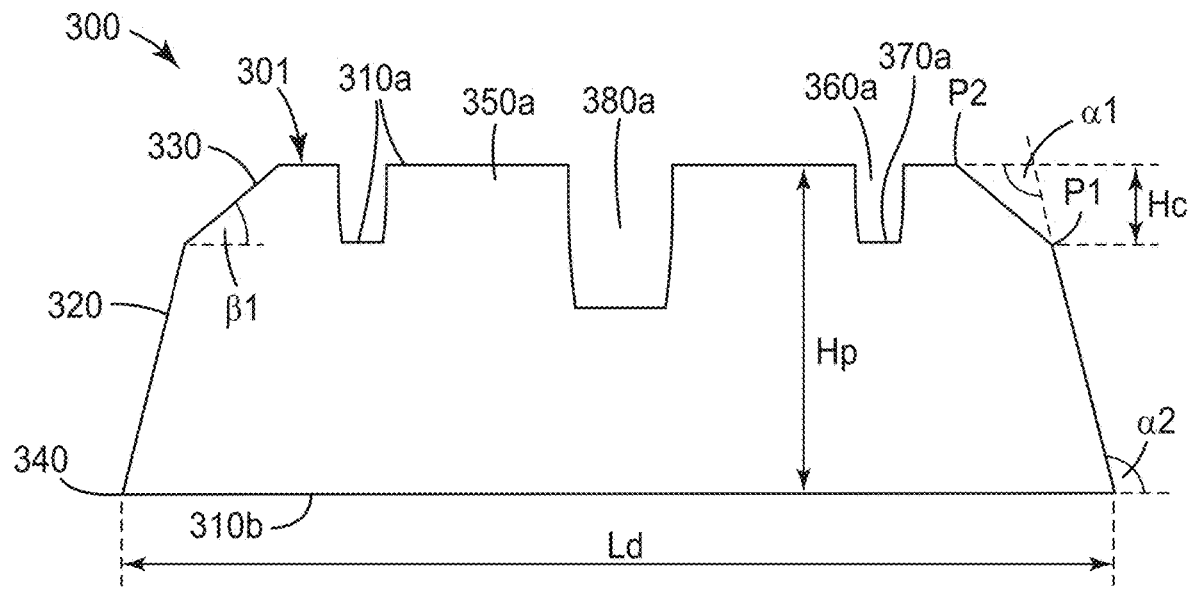
FIG. 3F is a schematic cross-sectional side view along line YY' of an alternative embodiment of the exemplary pillar of FIGS. 3A and 3B according to one exemplary embodiment of the present disclosure.

FIG. 3F, a schematic cross-sectional side view along line YY' of an alternative embodiment of the exemplary pillar of FIGS. 3A and 3B according to one exemplary embodiment of the present disclosure, shows pillar 300 having body 301 including a first surface 310*a*, an opposed second surface 310*b*, at least one sidewall 320, a first peripheral edge 330 adjoining the first surface 310*a* and the at least one sidewall 320 and a second peripheral edge 340 adjoining the first surface 310*a* and the at least one sidewall 320. The first peripheral edge 330 is a chamfered peripheral edge. The plurality of first structures 350*a*, at least one first void region 360*a* between the plurality of first structures and first land surface region 370*a* and at least one channel 380*a* are defined as in FIGS. 3A and 3B. Ld, Hp, $\alpha1$ and $\alpha2$ are as previously described in FIG. 1A. P1, P2 and $\beta1$ are defined below.

The greatest vertical distance from the intersection of the side wall and the peripheral edge to the first surface, is defined as the height of the chamfer, Hc. In some embodiments, the ratio of Hc/Hp is between about 0.05 to about 0.95, between about 0.05 to about 0.90, between about 0.05 to about 0.80, between about 0.05 to about 0.70, between about 0.10 to about 0.95, between about 0.10 to about 0.90, between about 0.10 to about 0.80, between about 0.10 to about 0.70, between about 0.20 to about 0.95, between about 0.20 to about 0.90, between about 0.20 to about 0.80, between about 0.20 to about 0.70, about 0.30 to about 0.95, between about 0.30 to about 0.90, between about 0.30 to about 0.80, or even between about 0.30 to about 0.70.

Throughout this disclosure, a chamfered peripheral edge may have one or more of the following characteristics. A chamfered peripheral edge may be a peripheral edge that includes an interior angle $\beta1$ between an imaginary plane perpendicular to the sidewall, at the intersection of the side wall and first peripheral edge, and the first peripheral edge. In some embodiments, the angle $\beta1$ is between about 20 degrees and about 89 degrees, between about 20 degrees and about 85 degrees, between about 20 degrees and about 80 degrees, between about 20 degrees and about 70 degrees, between about 25 degrees and about 89 degrees, between about 25 degrees and about 85 degrees, between about 25 degrees and about 80 degrees, between about 25 degrees and about 70 degrees, between about 30 degrees and about 89 degrees, between about 30 degrees and about 85 degrees, between about 30 degrees and about 80 degrees, between about 30 degrees and about 70 degrees, between about 40 degrees and about 89 degrees, between about 40 degrees and about 85 degrees, between about 40 degrees and about 80 degrees, or even between about 40 degrees and about 70 degrees. By interior angle it is meant that the angle lies within the interior of the body. $\beta1$ may also be defined as the intersection of the plane of the first surface, e.g. 310*a*, with the chamfered peripheral edge, e.g. 330 (see FIG. 3F), the plane of the chamfered peripheral edge being extended. Both definitions yield the same angle. A chamfered peripheral edge may be a substantially planar peripheral edge that may not be in the plane of the at least one side wall. A chamfered peripheral edge may have at least one distinct region of inflection points, e.g. a first region, P1, at the intersection of the peripheral edge and the at least one side wall, and/or a second region, P2, at the intersection of the first surface and the peripheral edge, as shown in FIG. 3F.

Figure 3G:
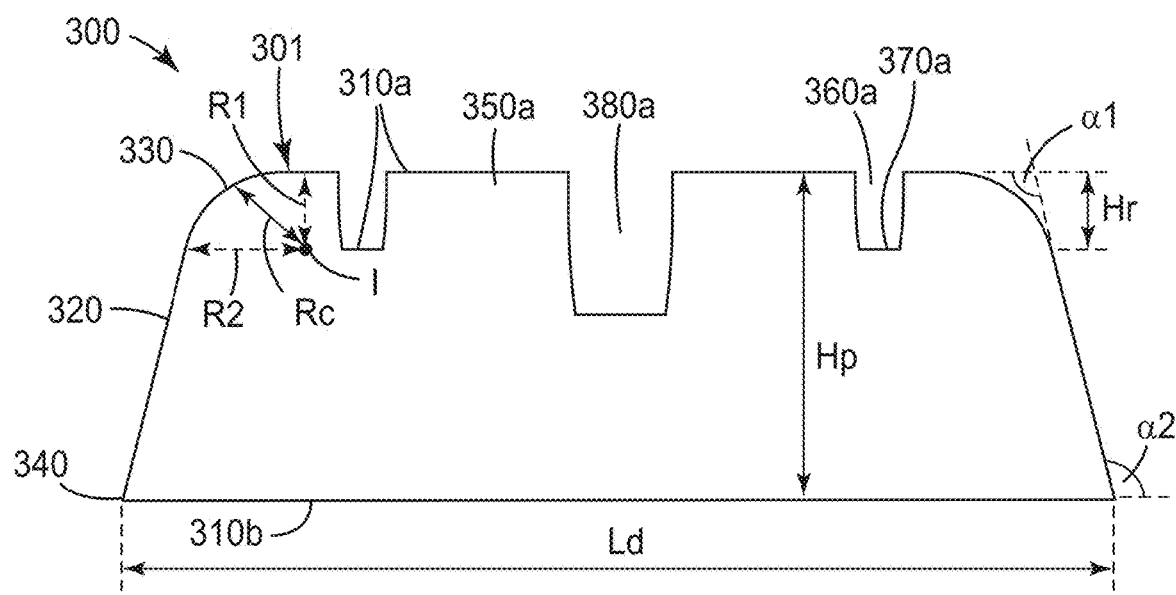
FIG. 3G is a schematic cross-sectional side view along line YY' of an alternative embodiment of the exemplary pillar of FIGS. 3A and 3B according to one exemplary embodiment of the present disclosure.

FIG. 3G, a schematic cross-sectional side view along line YY' of an alternative embodiment of the exemplary pillar of FIGS. 3A and 3B according to one exemplary embodiment of the present disclosure, shows pillar 300 having body 301 including a first surface 310*a*, an opposed second surface 310*b*, at least one sidewall 320, a first peripheral edge 330 adjoining the first surface 310*a* and the at least one sidewall 320 and a second peripheral edge 330 adjoining the second surface 310*b* and the at least one sidewall 320. The first peripheral edge 330 is a rounded peripheral edge. The plurality of first structures 350*a*, at least one first void region 360*a* between the plurality of first structures and first land surface region 370*a* and at least one channel 380*a* are defined as in FIGS. 3A and 3B. Ld, Hp, α1 and α2 are as previously described in FIG. 1A. Hr, Rc, R1, R2 and I are defined below.

The greatest vertical distance from the intersection of the side wall and the peripheral edge to the first surface, is defined as the height of the radius, Hr. In some embodiments, the ratio of Hr/Hp is between about 0.05 to about 0.95, between about 0.05 to about 0.90, between about 0.05 to about 0.80, between about 0.05 to about 0.70, between about 0.10 to about 0.95, between about 0.10 to about 0.90, between about 0.10 to about 0.80, between about 0.10 to about 0.70, between about 0.20 to about 0.95, between about 0.20 to about 0.90, between about 0.20 to about 0.80, between about 0.20 to about 0.70, about 0.30 to about 0.95, between about 0.30 to about 0.90, between about 0.30 to about 0.80, or even between about 0.30 to about 0.70.

Throughout this disclosure, a rounded peripheral edge may have the following characteristic. A rounded peripheral edge may have an average radius of curvature, Rc. Average radius of curvature Rc is the average radius of curvature of radius of curvatures R1 and R2. Radius of curvatures R1 and R2 are obtained by drawing a line perpendicular from the point of intersection of the top of first surface 310*a* and peripheral edge 330 and drawing a second line perpendicular to the point of intersection between sidewall 320 and peripheral edge 330. The two lines intersect at point I. The distance between point I and the top of first surface 310*a* is R1 and the distance between point I and sidewall 320 is R2.

In some embodiments, the ratio of Rc/Hp is between about 0.05 and about 0.95, between about 0.05 and about 0.90, between about 0.05 and about 0.80, between about 0.05 and about 0.70, between about 0.10 and about 0.95, between about 0.10 and about 0.90, between about 0.10 and about 0.80, between about 0.10 and about 0.70, between about 0.20 and about 0.95, between about 0.20 and about 0.90, between about 0.20 and about 0.80, between about 0.20 and about 0.70, between about 0.30 and about 0.95, between about 0.30 and about 0.90, between about 0.30 and about 0.80, or even between about 0.30 and about 0.70.

In some embodiments at least a portion of the first peripheral edge and at least a portion of the second peripheral edge is at least one of rounded or chamfered. In one embodiment the body may include a first peripheral edge, wherein at least a portion of the first peripheral edge is a chamfered peripheral edge, and a second peripheral edge, wherein at least a portion of the second peripheral edge is a chamfered peripheral edge. In another embodiment, the body may include a first peripheral edge, wherein at least a portion of the first peripheral edge is a chamfered peripheral edge, and a second peripheral edge, wherein at least a portion of the second peripheral edge is a rounded peripheral edge. In yet another embodiment, the body may include a first peripheral edge, wherein at least a portion of the first peripheral edge is a rounded peripheral edge, and a second peripheral edge, wherein at least a portion of the second peripheral edge is a rounded peripheral edge. In yet another embodiment, the body may include a first peripheral edge, wherein at least a portion of the first peripheral edge is a rounded peripheral edge, and a second peripheral edge, wherein at least a portion of the second peripheral edge is a chamfered peripheral edge. In the above embodiments, the entire first peripheral edge and/or the entire second peripheral edge may be at least one of a rounded peripheral edge and a chamfered peripheral edge.

The pillar bodies of the present disclosure may include a microstructure texture. In one embodiment, the present disclosure provides a pillar for use in a vacuum insulated glass unit comprising a body, the body includes a first surface and an opposed second surface, wherein at least one of a portion of the first surface and a portion of the second surface includes a microstructure texture. In some embodiments, a portion of both the first surface and second surface include a microstructure texture. In some embodiments one or both of the entire first surface and the entire second surface includes microstructure texture. In another embodiment, the present disclosure provides a pillar for use in a vacuum insulated glass unit comprising a body, the body includes a first surface and an opposed second surface, wherein the first surface includes a microstructure texture; and the second surface further includes a plurality of second structures, each second structure having a second structure face. Optionally, at least a portion of the second structure faces include a microstructure texture. In some embodiments, all of the second structure faces include a microstructure texture. In another embodiment, the present disclosure provides a pillar for use in a vacuum insulated glass unit comprising a body, the body includes a first surface and an opposed second surface, wherein the second surface includes a microstructure texture; and the first surface further includes a plurality of first structures, each first structure having a first structure face. Optionally, at least a portion of the first structure faces include a microstructure texture. In some embodiments, all of the first structure faces include a microstructure texture.

In yet another embodiment, the present disclosure provides a pillar for use in a vacuum insulated glass unit comprising a body, the body includes a first surface and an opposed second surface, the first surface further includes plurality of first structures, each first structure having a first structure face, wherein at least a portion of the first structure faces include a microstructure texture. In some embodiments, all of the first structure faces include a microstructure texture. Optionally, the second surface may include a microstructure texture. In another embodiment, the present disclosure provides a pillar for use in a vacuum insulated glass unit comprising a body, the body includes a first surface and an opposed second surface, the second surface further includes plurality of second structures, each second structure having a second structure face, wherein at least a portion of the second structure faces include a microstructure texture. In some embodiments, all of the second structure faces include a microstructure texture. Optionally, the first surface may include a microstructure texture. In yet another embodiment, the present disclosure provides a pillar for use in a vacuum insulated glass unit comprising a body, the body includes a first surface and an opposed second surface, the first surface further includes plurality of first structures, each first structure having a first structure face, wherein at least a portion of the first structure faces include a microstructure texture; and the second surface further includes plurality of second structures, each second structure having a second structure face, wherein at least a portion of the second structure faces include a microstructure texture. In some embodiments, all of the first structure faces include a microstructure texture. In some embodiments, all of the second structure faces include a microstructure texture. In some embodiments, all of the first structure faces and all of the second structure faces, include a microstructure texture.

The pillars bodies of the pillar embodiments that include a microstructure texture may further included at least one sidewall and a first peripheral edge adjoining the first surface and the at least one sidewall, wherein at least a portion of the first peripheral edge adjoining the first surface and the at least one sidewalls may be one of a chamfered peripheral edge or a rounded peripheral edge. A chamfered peripheral edge and a rounded peripheral edge being as previously described. The pillars bodies of the pillar embodiments that include a microstructure texture may further included at least one sidewall and a second peripheral edge adjoining the second surface and the at least one sidewall, wherein at least a portion of the second peripheral edge may be one of a chamfered peripheral edge or a rounded peripheral edge. A chamfered peripheral edge and a rounded peripheral edge being as previously described. The pillars bodies of the pillar embodiments that include a microstructure texture may further included at least one a sidewall, a first peripheral edge adjoining the first surface and the at least one sidewall, wherein at least a portion of the first peripheral edge adjoining the first surface and the at least one sidewalls may be one of a chamfered peripheral edge or a rounded peripheral edge; and a second peripheral edge adjoining the second surface and the at least one sidewall, wherein at least a portion of the second peripheral edge adjoining the first surface and the at least one sidewalls may be one of a chamfered peripheral edge or a rounded peripheral edge. A chamfered peripheral edge and a rounded peripheral edge being as previously described.

Figure 3H:
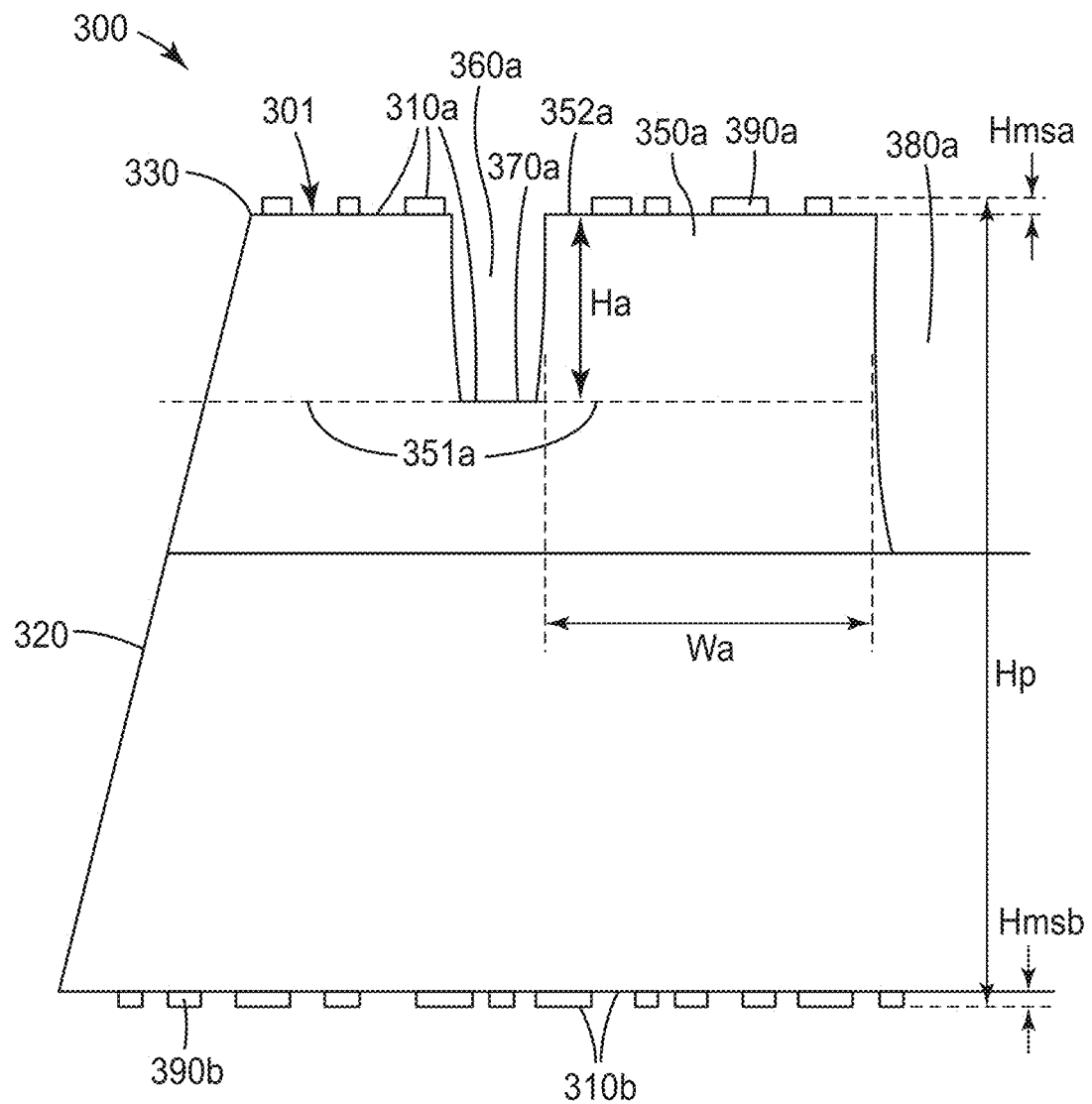
FIG. 3H is a schematic cross-sectional side view along line YY' of an alternative embodiment of a portion of the exemplary pillar of FIGS. 3A and 3B, scaled to a larger size, according to one exemplary embodiment of the present disclosure.

FIG. 3H is a schematic cross-sectional side view along line YY' of an alternative embodiment of a portion of the exemplary pillar of FIGS. 3A and 3B, scaled to a larger size. FIG. 3H shows pillar 300 including body 301. Body 301 further includes first surface 310$a$ and opposed second surface 310$b$, sidewall 320 and peripheral edge 330. First surface 310$a$ includes at least one first structure 350$a$ having a first structure base 351$a$ and a first structure face 352$a$. The first structure face 352$a$ includes first microstructure texture 390$a$ having a height, Hmsa. In this exemplary embodiment, second surface 310$b$ includes a second microstructure texture 390$b$, of height, Hmsb. The pillar height, Hp, the plurality of first structure heights, Ha, and first structure width, Wa, are as previously defined in FIGS. 3A and 3B.

In some embodiments, the height of the microstructure texture is less than the height of the plurality of first structures and/or seconds structures that the microstructure texture is disposed on. In some embodiments, the height of the microstructure texture is between about 5 nanometers to about 5 microns, between about 5 nanometers to about 4 microns, between about 5 nanometers to about 3 microns, between about 5 nanometers to about 1 microns, between about 5 nanometers to about 0.5 microns, between about 10 nanometers to about 5 microns, between about 10 nanometers to about 4 microns, between about 10 nanometers to about 3 microns, between about 10 nanometers to about 1 microns, between about 10 nanometers to about 0.5 microns, between about 25 nanometers to about 5 microns, between about 25 nanometers to about 4 microns, between about 25 nanometers to about 3 microns, between about 25 nanometers to about 1 microns, between about 25 nanometers to about 0.5 microns, between about 50 nanometers to about 5 microns, between about 50 nanometers to about 4 microns, between about 50 nanometers to about 3 microns, between about 50 nanometers to about 1 microns, or even between about 50 nanometers to about 0.5 microns. In some embodiments, the microstructure texture may be in random pattern. In some embodiments, the microstructure texture may be in a pattern.

In some embodiments, the length of microstructure texture is less than the length of the plurality of first structures and/or seconds structures that the microstructure texture is disposed on. In some embodiments, the length of the microstructure texture is between about 5 nanometers to about 5 microns, between about 5 nanometers to about 4 microns, between about 5 nanometers to about 3 microns, between about 5 nanometers to about 1 microns, between about 5 nanometers to about 0.5 microns, between about 10 nanometers to about 5 microns, between about 10 nanometers to about 4 microns, between about 10 nanometers to about 3 microns, between about 10 nanometers to about 1 microns, between about 10 nanometers to about 0.5 microns, between about 25 nanometers to about 5 microns, between about 25 nanometers to about 4 microns, between about 25 nanometers to about 3 microns, between about 25 nanometers to about 1 microns, between about 25 nanometers to about 0.5 microns, between about 50 nanometers to about 5 microns, between about 50 nanometers to about 4 microns, between about 50 nanometers to about 3 microns, between about 50 nanometers to about 1 microns, or even between about 50 nanometers to about 0.5 microns. In some embodiments, the microstructure texture may be in random pattern. In some embodiments, the microstructure texture may be in a pattern.

In some embodiments, the width of microstructure texture is less than the width of the plurality of first structures and/or seconds structures that the microstructure texture is disposed on. In some embodiments, the width of the microstructure texture is between about 5 nanometers to about 5 microns, between about 5 nanometers to about 4 microns, between about 5 nanometers to about 3 microns, between about 5 nanometers to about 1 microns, between about 5 nanometers to about 0.5 microns, between about 10 nanometers to about 5 microns, between about 10 nanometers to about 4 microns, between about 10 nanometers to about 3 microns, between about 10 nanometers to about 1 microns, between about 10 nanometers to about 0.5 microns, between about 25 nanometers to about 5 microns, between about 25 nanometers to about 4 microns, between about 25 nanometers to about 3 microns, between about 25 nanometers to about 1 microns, between about 25 nanometers to about 0.5 microns, between about 50 nanometers to about 5 microns, between about 50 nanometers to about 4 microns, between about 50 nanometers to about 3 microns, between about 50 nanometers to about 1 microns, or even between about 50 nanometers to about 0.5 microns. In some embodiments, the microstructure texture may be in random pattern. In some embodiments, the microstructure texture may be in a pattern.

In some embodiments the ratio of Hmsa/Ha and/or Hmsb/Hb, Ha and Hb as previously defined, may be between about 0.005 and about 0.75, may be between about 0.03 and about 0.75, may be between about 0.05 and about 0.75, may be between about 0.1 and about 0.75, may be between about 0.15 and about 0.75, may be between about 0.20 and about 0.75, may be between about 0.005 and about 0.50, may be between about 0.03 and about 0.50, between about 0.05 and about 0.50, between about 0.10 and about 0.50, between about 0.15 and about 0.50, between about 0.20 and about 0.50, may be between about 0.005 and about 0.40, between about 0.03 and about 0.4, between about 0.05 and about 0.4, between about 0.10 and about 0.40, between about 0.15 and about 0.40, between about 0.20 and about 0.40, may be between about 0.005 and about 0.30, between about 0.03 and about 0.30, between about 0.05 and about 0.30, between about 0.10 and about 0.30, between about 0.15 and about 0.30, or even between about 0.20 and about 0.30.

The microstructure textured may be formed by techniques known in the art, including, but not limited to, sandblasting, beadblasting, chemical etching, plasma coating, polymer coating, release coating, cutting, sanding, grinding, replication, microreplication and the like.

Useful material and processes for fabricating the pillars of the present disclosure are included in pending U.S. patent application Ser. No. 14/025,958, titled "VACUUM GLAZING PILLARS FOR INSULATED GLASS UNITS", filed Sep. 13, 2013, U.S. Provisional Appl. Nos. 62/048,972, titled "METAL OXIDE PARTICLES", filed Sep. 11, 2014 and 62/127,569, titled GEL COMPOSITIONS AND SINTERED ARTICLES PREPARED THEREFROM", filed Mar. 3, 2015, which are incorporated herein by reference in their entirety.

The pillar body is at least one of a continuous, inorganic material or a polymer composite. Throughout this disclosure a "continuous inorganic material" is an inorganic material that spans the entire length, width and height of the pillar body. Due to the applied loads the pillars must withstand, it is preferable that they have a high compressive strength. The compressive strength of the pillar may be greater than about 400 MPa, greater than about 600 MPa, greater than about 800 MPa, greater than about 1 GPa, or even greater than about 2 GPa. In some embodiments, the compressive strength is between about 400 MPa and about 110 GPa, between about 400 MPa and about 50 GPa, between about 400 MPa and about 25 GPa, between about 400 MPa and about 12 GPa, 1 GPa and about 110 GPa, between about 1 GPa and about 50 GPa, between about 1 GPa and about 25 GPa, or even between about 1 GPa and about 12 GPa. The pillar body may have a thermal conductivity of less than about 40 W m$^{-2\circ}$ K$^{-1}$, less than 20 W m$^{-2\circ}$ K$^{-1}$, less than 10 W m$^{-2\circ}$ K$^{-1}$ or even less than 5 W m$^{-2\circ}$ K$^{-1}$. The pillar body may have a thermal conductivity of at least 0.1 W m$^{-2\circ}$ K$^{-1}$. In some embodiments, the continuous inorganic material includes a ceramic, such as alpha alumina, and is fabricated via the molding of a sol gel precursor (the "sol gel route"). In some embodiments, the continuous inorganic material includes at least one the following: ceramic nanoparticles ($Al_2O_3$, $SiO_2$, $ZrO_2$, SiC, $Si_3N_4$, and combinations thereof); ceramic precursors such as silsesquioxane and polysilazanes; sintered ceramic ($Al_2O_3$, $SiO_2$, $ZrO_2$, SiC, $Si_3N_4$, and the like); glass ceramic (the MACOR product, LAS-system, MAS-system, ZAS-system); glass frit; glass beads or glass bubbles; metal; and combinations thereof. The continuous inorganic material may be a sintered ceramic. The sintered ceramic may include, but is not limited to, at least one of zirconia, alumina, silica, silicon carbide and silicon nitride. In other embodiments, the polymer composite comprises a thermal or radiation cured composite made from thermally stable acrylate monomers or oligomers, or both, and a nanoparticle filler such as nanozirconia (the "cast and cure route").

Ceramics are often opaque in appearance due to the scattering of light by pores in the ceramic. In order to achieve even a limited level of translucency, the density of the ceramic is typically greater than 99% of theoretical. Higher clarity can require levels above 99.9% or even 99.99%. Two methods known in the art for achieving very high densities in ceramic materials are hot isostatic pressing and spark plasma sintering.

In one embodiment of the present disclosure, the continuous inorganic material may be crystalline metal oxide wherein at least 70 mole percent of the crystalline metal oxide is $ZrO_2$, wherein from 1 to 15 mole percent (in some embodiments 1 to 9 mole percent) of the crystalline metal oxide is $Y_2O_3$, and wherein the $ZrO_2$ has an average grain size in a range from 75 nanometers to 400 nanometers. The crystalline metal oxide may have and a density of at least 98.5 (in some embodiments, 99, 99.5, 99.9, or even at least 99.99) percent of theoretical density.

In calculating the theoretical density, the volume of unit cell is measured by XR D for each composition or calculated via ionic radii and crystal type.

$$\rho_{theory}=(N_cA)/(V_cN_a)$$

Where
$N_c$=number of atoms in unit cell;
A=Atomic Weight [kg/mol];
$V_c$=Volume of unit cell [m$^3$]; and
$N_a$=Avogadro's number [atoms/mol].

In another embodiment the pillar body is formed from a reaction mixture that includes (a) 20 to 60 weight percent zirconia-based particles based on a total weight of the reaction mixture, the zirconia-based particles having an average particle size no greater than 100 nanometers and containing at least 70 mole percent $ZrO_2$, (b) 30 to 75 weight percent of a solvent medium based on the total weight of the reaction mixture, the solvent medium containing at least 60 percent of an organic solvent having a boiling point equal to at least 150° C., (c) 2 to 30 weight percent polymerizable material based on a total weight of the reaction mixture, the polymerizable material including (1) a first surface modification agent having a free radical polymerizable group; and (d) a photoinitiator for a free radical polymerization reaction.

The zirconia-based particles can contain 0 to 30 weight percent yttrium oxide based on the total moles of inorganic oxide present. If yttrium oxide is added to the zirconia-based particles, it is often added in an amount equal to at least 1 mole percent, at least 2 mole percent, or at least 5 mole percent. The amount of yttrium oxide can be up to 30 mole percent, up to 25 mole percent, up to 20 mole percent, or up to 15 mole percent. For example, the amount of yttrium oxide can be in a range of 1 to 30 mole percent, 1 to 25 mole percent, 2 to 25 mole percent, 1 to 20 mole percent, 2 to 20 mole percent, 1 to 15 mole percent, 2 to 15 mole percent, 5 to 30 mole percent, 5 to 25 mole percent, 5 to 20 mole percent, or 5 to 15 mole percent. The mole percent amounts are based on the total moles of inorganic oxide in the zirconia-based particles.

The zirconia-based particles can contain 0 to 10 mole percent lanthanum oxide based on the total moles of inorganic oxide present. If lanthanum oxide is added to the zirconia-based particles, it can be used in an amount equal to at least 0.1 mole percent, at least 0.2 mole percent, or at least 0.5 mole percent. The amount of lanthanum oxide can be up to 10 mole percent, up to 5 mole percent, up to 3 mole percent, up to 2 mole percent, or up to 1 mole percent. For example, the amount of lanthanum oxide can be in a range of 0.1 to 10 mole percent, 0.1 to 5 mole percent, 0.1 to 3 mole percent, 0.1 to 2 mole percent, or 0.1 to 1 mole percent. The mole percent amounts are based on the total moles of inorganic oxide in the zirconia-based particles.

In some embodiments, the zirconia-based particles contain 70 to 100 mole percent zirconium oxide, 0 to 30 mole percent yttrium oxide, and 0 to 10 mole percent lanthanum oxide. For example, the zirconia-based particles contain 70 to 99 mole percent zirconium oxide, 1 to 30 mole percent yttrium oxide, and 0 to 10 mole percent lanthanum oxide. In other examples, the zirconia-based particles contain 75 to 99 mole percent zirconium oxide, 1 to 25 mole percent yttrium oxide, and 0 to 5 mole percent lanthanum oxide or 80 to 99 mole percent zirconium oxide, 1 to 20 mole percent yttrium oxide, and 0 to 5 mole percent lanthanum oxide or 85 to 99 mole percent zirconium oxide, 1 to 15 mole percent yttrium oxide, and 0 to 5 mole percent lanthanum oxide. In still other embodiments, the zirconia-based particles contain 85 to 95 mole percent zirconium oxide, 5 to 15 mole percent yttrium oxide, and 0 to 5 mole percent (e.g., 0.1 to 5 mole percent or 0.1 to 2 mole percent) lanthanum oxide. The mole percent amounts are based on the total moles of inorganic oxide in the zirconia-based particles.

Other inorganic oxides can be used in combination with a rare earth element or in place of a rare earth element. For example, calcium oxide, magnesium oxide, or a mixture thereof can be added in an amount in a range of 0 to 30 weight percent based on the total moles of inorganic oxide present. The presence of these inorganic oxides tends to decrease the amount of monoclinic phase formed. If calcium oxide and/or magnesium oxide is added to the zirconia-based particles, the total amount added is often at least 1 mole percent, at least 2 mole percent, or at least 5 mole percent. The amount of calcium oxide, magnesium oxide, or a mixture thereof can be up to 30 mole percent, up to 25 mole percent, up to 20 mole percent, or up to 15 mole percent. For example, the amount can be in a range of 1 to 30 mole percent, 1 to 25 mole percent, 2 to 25 mole percent, 1 to 20 mole percent, 2 to 20 mole percent, 1 to 15 mole percent, 2 to 15 mole percent, 5 to 30 mole percent, 5 to 25 mole percent, 5 to 20 mole percent, or 5 to 15 mole percent. The mole percent amounts are based on the total moles of inorganic oxide in the zirconia-based particles.

Further, aluminum oxide can be included in an amount in a range of 0 to less than 1 mole percent based on a total moles of inorganic oxides in the zirconia-based particles. Some example zirconia-based particles contain 0 to 0.5 mole percent, 0 to 0.2 mole percent, or 0 to 0.1 mole percent of these inorganic oxides.

The reaction mixture (casting sol) used to form the gel composition typically contains 20 to 60 weight percent zirconia-based particles based on a total weight of the reaction mixture. The amount of zirconia-based particles can be at least 25 weight percent, at least 30 weight percent, at least 35 weight percent, or at least 40 weight percent and can be up to 55 weight percent, up to 50 weight percent, or up to 45 weight percent. In some embodiments, the amount of the zirconia-based particles are in a range of 25 to 55 weight percent, 30 to 50 weight percent, 30 to 45 weight percent, 35 to 50 weight percent, 40 to 50 weight percent, or 35 to 45 weight percent based on the total weight of the reaction mixture used for the gel composition.

Suitable organic solvents that have a boiling point equal to 150° C. are typically selected to be miscible with water, as the zirconia-based particles may be formed in a water base medium and the organic solvents may be added to the zirconia-based particle sol and the water removed through distillation, leaving the organic solvent in its place. In some embodiments, the solvent medium contains at least 70 weight percent, at least 80 weight percent, at least 90 weight percent, at least 95 weight percent, at least 97 weight percent, at least 98 weight percent, or at least 99 weight percent of the organic solvent having a boiling point equal to at least 150° C. The boiling point is often at least 160° C., at least 170° C., at least 180° C., or at least 190° C.

The organic solvent is often a glycol or polyglycol, mono-ether glycol or mono-ether polyglycol, di-ether glycol or di-ether polyglycol, ether ester glycol or ether ester polyglycol, carbonate, amide, or sulfoxide (e.g., dimethyl sulfoxide). The organic solvents usually have one or more polar groups. The organic solvent does not have a polymerizable group; that is, the organic solvent is free of a group that can undergo free radical polymerization. Further, no component of the solvent medium has a polymerizable group that can undergo free radical polymerization.

Suitable glycols or polyglycols, mono-ether glycols or mono-ether polyglycols, di-ether glycols or di-ether polyglycols, and ether ester glycols or ether ester polyglycols are often of Formula (I).

$$R^1O\text{—}(R^2O)_n\text{—}R^1 \qquad (I)$$

In Formula (I), each $R^1$ independently is hydrogen, alkyl, aryl, or acyl. Suitable alkyl groups often have 1 to 10 carbon atoms, 1 to 6 carbon atoms, or 1 to 4 carbon atoms. Suitable aryl groups often have 6 to 10 carbon atoms and are often phenyl or phenyl substituted with an alkyl group having 1 to 4 carbon atoms. Suitable acyl groups are often of formula —(CO)$R^a$ where $R^a$ is an alkyl having 1 to 10 carbon atoms, 1 to 6 carbon atoms, 1 to 4 carbon atoms, 2 carbon atoms, or 1 carbon atom. The acyl is often an acetate group (—(CO)CH$_3$). In Formula (I), each $R^2$ is typically ethylene or propylene. The variable n is at least 1 and can be in a range of 1 to 10, 1 to 6, 1 to 4, or 1 to 3. Other suitable organic solvents are carbonates of Formula (II).

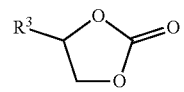

(II)

In Formula (II), $R^3$ is hydrogen or an alkyl such as an alkyl having 1 to 4 carbon atoms, 1 to 3 carbon atoms, or 1 carbon atom. Examples include ethylene carbonate and propylene carbonate.

Yet other suitable organic solvents are amides of Formula (III).

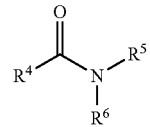

(III)

In Formula (III), group $R^4$ is hydrogen, alkyl, or combines with $R^5$ to form a five-membered ring including the carbonyl attached to $R^4$ and the nitrogen atom attached to $R^5$. Group $R^5$ is hydrogen, alkyl, or combines with $R^4$ to form a five-membered ring including the carbonyl attached to $R^4$ and the nitrogen atom attached to $R^5$. Group $R^6$ is hydrogen or alkyl. Suitable alkyl groups for $R^4$, $R^5$, and $R^6$ have 1 to 6 carbon atoms, 1 to 4 carbon atoms, 1 to 3 carbon atoms, or 1 carbon atom. Examples of amide organic solvents of Formula (III) include, but are not limited to, formamide, N,N-dimethylformamide, N,N-dimethylacetamide, N,N-diethylacetamide, N-methyl-2-pyrrolidone, and N-ethyl-2-pyrrolidone.

The reaction mixture often includes at least 30 weight percent solvent medium. In some embodiments, the reaction mixture contains at least 35 weight percent, or at least 40 weight percent solvent medium. The reaction mixture can contain up to 75 weight percent, up to 70 weight percent, up to 65 weight percent, up to 60 weight percent, up to 55 weight percent, up to 50 weight percent, or up to 45 weight percent solvent medium. For example, the reaction mixture can contain 30 to 75 weight percent, 30 to 70 weight percent, 30 to 60 weight percent, 30 to 50 weight percent, 30 to 45 weight percent, 35 to 60 weight percent, 35 to 55 weight percent, 35 to 50 weight percent, or 40 to 50 weight percent solvent medium. The weight percent values are based on the total weight of the reaction mixture.

The solvent medium typically contains less than 15 weight percent water, less than 10 percent water, less than 5 percent water, less than 3 percent water, less than 2 percent water, less than 1 weight percent, or even less than 0.5 weight percent water after the solvent exchange (e.g., distillation) process.

The reaction mixture includes one or more polymerizable materials that have a polymerizable group that can undergo free radical polymerization (i.e., the polymerizable group is free radical polymerizable). In many embodiments, the polymerizable group is an ethylenically unsaturated group such as a (meth)acryloyl group, which is a group of formula —(CO)—CR$^b$═CH$_2$ where R$^b$ is hydrogen or methyl. In some embodiments, the polymerizable group is a vinyl group (—CH═CH$_2$) that is not a (meth)acryloyl group. The polymerizable material is usually selected so that it is soluble in or miscible with the organic solvent having a boiling point equal to at least 150° C.

The reaction mixture includes one or more polymerizable materials that have a polymerizable group that can undergo free radical polymerization (i.e., the polymerizable group is free radical polymerizable). In many embodiments, the polymerizable group is an ethylenically unsaturated group such as a (meth)acryloyl group, which is a group of formula —(CO)—CR$^b$═CH$_2$ where R$^b$ is hydrogen or methyl. In some embodiments, the polymerizable group is a vinyl group (—CH═CH$_2$) that is not a (meth)acryloyl group. The polymerizable material is usually selected so that it is soluble in or miscible with the organic solvent having a boiling point equal to at least 150° C.

The polymerizable material includes a first monomer that is a surface modification agent having a free radical polymerizable group. The first monomer typically modifies the surface of the zirconia-based particles. Suitable first monomers have a surface modifying group that can attach to a surface of the zirconia-based particles. The surface modifying group is usually a carboxyl group (—COOH or an anion thereof) or a silyl group of formula —Si(R$^7$)(R$^8$)$_{3-x}$ where R$^7$ is a non-hydrolyzable group, R$^8$ is hydroxyl or a hydrolyzable group, and the variable x is an integer equal to 0, 1, or 2. Suitable non-hydrolyzable groups are often alkyl groups such as those having 1 to 10, 1 to 6, 1 to 4, or 1 to 2 carbon atoms. Suitable hydrolyzable groups are often a halo (e.g., chloro), acetoxy, alkoxy group having 1 to 10, 1 to 6, 1 to 4, or 1 to 2 carbon atoms, or group of formula OR$^d$—OR$^e$ where R$^d$ is an alkylene having 1 to 4 or 1 to 2 carbon atoms and R$^e$ is an alkyl having 1 to 4 or 1 to 2 carbon atoms.

The first monomer can function as a polymerizable surface modification agent. Multiple first monomers can be used. The first monomer can be the only kind of surface modification agent or can be combined with one or more other non-polymerizable surface modification agents such as those discussed above. In some embodiments, the amount of the first monomer is at least 20 weight percent based on a total weight of polymerizable material. For example, the amount of the first monomer is often at least 25 weight percent, at least 30 weight percent, at least 35 weight percent, or at least 40 weight percent. The amount of the first monomer can be up to 100 percent, up to 90 weight percent, up to 80 weight percent, up to 70 weight percent, up to 60 weight percent, or up to 50 weight percent. Some reaction mixtures contain 20 to 100 weight percent, 20 to 80 weight percent, 20 to 60 weight percent, 20 to 50 weight percent, or 30 to 50 weight percent of the first monomer based on a total weight of polymerizable material.

The first monomer (i.e., the polymerizable surface modification monomer) can be the only monomer in the polymerizable material or can be combined with one or more second monomers that are soluble in the solvent medium. Any suitable second monomer that does not have a surface modification group can be used. That is, the second monomer does not have a carboxyl group or a silyl group. The second monomers are often polar monomers (e.g., non-acidic polar monomers), monomers having a plurality of polymerizable groups, alkyl (meth)acrylates, and mixtures thereof.

Overall, the polymerizable material typically contains 20 to 100 weight percent first monomer and 0 to 80 weight percent second monomer based on a total weight of polymerizable material. For example, polymerizable material includes 30 to 100 weight percent first monomer and 0 to 70 weight percent second monomer, 30 to 90 weight percent first monomer and 10 to 70 weight percent second monomer, 30 to 80 weight percent first monomer and 20 to 70 weight percent second monomer, 30 to 70 weight percent first monomer and 30 to 70 weight percent second monomer, 40 to 90 weight percent first monomer and 10 to 60 weight percent second monomer, 40 to 80 weight percent first monomer and 20 to 60 weight percent second monomer, 50 to 90 weight percent first monomer and 10 to 50 weight percent second monomer, or 60 to 90 weight percent first monomer and 10 to 40 weight percent second monomer.

In some applications, it can be advantageous to minimize the weight ratio of polymerizable material to zirconia-based particles in the reaction mixture. This tends to reduce the amount of decomposition products of organic material that needs to be burned out prior to formation of the sintered article. The weight ratio of polymerizable material to zirconia-based particles is often at least 0.05, at least 0.08, at least 0.09, at least 0.1, at least 0.11, or at least 0.12. The weight ratio of polymerizable material to zirconia-based particles can be up to 0.80, up to 0.6, up to 0.4, up to 0.3, up to 0.2, or up to 0.1. For example, the ratio can be in a range of 0.05 to 0.8, 0.05 to 0.6, 0.05 to 0.4, 0.05 to 0.2, 0.05 to 0.1, 0.1 to 0.8, 0.1 to 0.4, or 0.1 to 0.3.

The reaction mixture used to form the gel composition contains a photoinitiator. The reaction mixtures advantageously are initiated by application of actinic radiation. That is, the polymerizable material is polymerized using a photoinitiator rather than a thermal initiator. Surprisingly, the use of a photoinitiator rather than a thermal initiator tends to result in a more uniform cure throughout the gel composition ensuring uniform shrinkage in subsequent steps involved in the formation of sintered articles. In addition, the outer surface of the cured part is more uniform and more defect free when a photoinitiator is used rather than a thermal initiator.

Photoinitiated polymerization reactions often lead to shorter curing times and fewer concerns about competing inhibition reactions compared to thermally initiated polymerization reactions. The curing times can be more easily controlled than with thermal initiated polymerization reactions that must be used with opaque reaction mixtures.

In most embodiments, the photoinitiators are selected to respond to ultraviolet and/or visible radiation. Stated differently, the photoinitiators usually absorb light in a wavelength range of 200 to 600 nanometers, 300 to 600 nanometers, or 300 to 450 nanometers. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, N.J., USA) or under the trade designation ESACURE KB-1 from Sartomer (Exton, Pa., USA)). Other exemplary photoinitiators are substituted benzophenones such as 1-hydroxycyclohexyl benzophenone (available, for example, under the trade designation "IRGACURE 184" from Ciba Specialty Chemicals Corp., Tarrytown, N.Y.). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl) oxime. Other suitable photoinitiators include camphoquinone, 1-hydroxycyclohexyl phenyl ketone (IRGACURE 184), bis(2,4,6-trimethylbenzoyl)phenylphosphineoxide (IRGACURE 819), 1-[4-(2-hydroxyethoxy)phenyl]-2-hydroxy-2-methyl-1-propane-1-one (IRGACURE 2959), 2-benzyl-2-dimethylamino-1-(4-morpholinophenyl)butanone (IRGACURE 369), 2-methyl-1-[4-(methylthio)phenyl]-2-morpholinopropan-1-one (IRGACURE 907), and 2-hydroxy-2-methyl-1-phenyl propan-1-one (DAROCUR 1173).

The photoinitiator is typically present in an amount in the range of 0.01 to 5 weight percent, in the range of 0.01 to 3 weight percent, 0.01 to 1 weight percent, or 0.01 to 0.5 weight percent based on a total weight of polymerizable material in the reaction mixture.

Pillars may be monolithic or composite. Composite pillars may comprise a high compressive strength sintered ceramic core and one or more functional layers. Alternately, composite pillars may comprise a thermally stable organic, inorganic, or hybrid polymeric binder and an inorganic nanoparticle filler.

The pillar body can be fabricated by a molding process. The shape of the body is determined by the mold cavity used. The mold cavity, generally, having the inverse shape corresponding to and dimensions of the desired pillar body shape. The desired chamfered edge or rounded edge may be included in the mold cavity (the chamfered edge or rounded edge inverse shape), such that, the chamfered or rounded edge may be integrally in the pillar body, when the body is formed If at least one channel or a plurality of structures are to be included in the pillar bodies, their inverse shape may be included in the corresponding region of the mold and the at least one channel or the plurality of structures may be integrally formed in the pillar body, when the body is formed. Additionally, a plurality of structures or at least one channel may be formed on a surface of the body, typically the second surface, by using a textured liner to cover the pillar body mold opening. The textured liner makes contact with the sol used to make the pillar body, and during the curing process, the texture of the textured liner is embossed into the surface of the pillar body. The textured liner will have a topography that is the inverse topography of the desired pillar body topography, i.e. the at least one channel or the plurality of structures.

Monolithic pillar bodies can be made via continuous and discontinuous processes. One such process is a sol gel process. Sol gel processes are disclosed in pending U.S. application Ser. No. 14/025,958, titled "VACUUM GLAZING PILLARS FOR INSULATED GLASS UNITS", filed Sep. 13, 2013 and U.S. Provisional Appl. No. 62/127,569, titled GEL COMPOSITIONS AND SINTERED ARTICLES PREPARED THEREFROM", filed Mar. 3, 2015, which has been incorporated herein in its entirety by reference. This process involves molding of gel bodies from a reaction mixture on a continuous belt, drying, demolding, and sintering. This process may yield bodies with some asymmetry. Surfaces in contact with the mold during the fabrication side may be smoother than the surface with an air interface. In addition, samples may warp or cup slightly during drying to form a pillar with a concave air side and a convex mold side. Using higher solids content sols and slower drying processes results in reduced cupping due to drying shrinkage. The materials and process parameters are optimized to compensate for the differential shrinkage as well as to keep the pillars flat. Optimal conditions for producing sol-gel pillar bodies may produce discrete pillars that are suitable for use in vacuum insulated glazing without further modification.

A modified sol-gel process involving densification of an aerogel intermediate has been shown to greatly improve fidelity and minimize cupping or distortion during the drying process.

In an optional step, it may be desired to introduce a modifying additive by an impregnation process. A water-soluble salt can be introduced by impregnation into the pores of the calcined, pillar bodies. Then the pillar bodies are prefired again. This option is further described in European Patent Application Publication No. 293,163. The pillar bodies were calcined at approximately 650 degrees Celsius and then saturated with a mixed nitrate solution of the following concentration (reported as oxides): 1.8% each of MgO, $Y_2O_3$, $Nd_2O_3$ and $La_2O_3$. The excess nitrate solution was removed and the saturated pillar bodies with openings were allowed to dry after which the pillar bodies were again calcined at 650 degrees Celsius and sintered at approximately 1400 degrees Celsius. Both the calcining and sintering was performed using rotary tube kilns.

In one embodiment, a method of making a pillar body includes (a) providing a mold having a mold cavity, wherein the mold cavity includes the inverse shape corresponding to at least one of a chamfered peripheral edge and a rounded peripheral edge (b) positioning a reaction mixture within the mold cavity, (c) polymerizing the reaction mixture to form a shaped gel body that is in contact with the mold cavity, (d) removing the shaped gel body from the mold cavity, wherein the shaped gel body retains a size and shape identical to the mold cavity, (e) forming a dried shaped gel body by removing the solvent medium, (f) heating the dried shaped gel body to form a sintered body. The sintered body has a shape identical to the mold cavity including at least one of a chamfered peripheral edge and a rounded peripheral edge but may be reduced in size proportional to an amount of shrinkage. The reaction mixture may be as described above. The dimensions of the mold cavity may be adjusted to account for the shrinkage.

In some embodiments, the pillar body may be a polymer composite, including a binder, i.e. a polymer binder. The binder may be based on thermally stable organic, inorganic, or hybrid polymers. These materials are typically dimensionally stable upon exposures to temperatures up to 350° C. Preferably, the binder material has a low thermal conductivity, which would reduce the transfer of heat from the exterior through to the interior window pane.

Thermally stable binders include, but are not limited to, at least one of: polyimide, polyamide, polyphenylene, polyphenylene oxide, polyaramide (e.g., the KEVLAR product from Dupont), polysulfone, polysulfide, polybenzimidazoles, and polycarbonate. One exemplary binder that may be used is the ULTEM product (polyetherimide) manufactured by SABIC Innovative Plastics. Another exemplary binder is an imide-extended bismaleimide such as BMI-1700, available from Designer Molecules (San Diego, Calif.), which can be melt-processed at low temperatures and then cured to form a crosslinked polyimide network.

The polymer binder may include thermally stable inorganic, siloxane, or hybrid polymeric species. These materials are typically dimensionally stable upon exposures to temperatures up to 350° C. Amorphous organopolysiloxane networks, a chemical bond network derived from condensation of organosiloxane precursors, is an example of a suitable thermally stable polymeric binder. Silsesquioxanes or polysilsesquioxanes are derived from fundamental molecular units that have silicon coordinated with three bridging oxygen atoms. Because of this, silsesquoxanes can form a wide variety of complex three-dimensional shapes. Various polysilsesquioxanes can be used, for example, polymethylsilsesquioxane, polyoctylsilsesquioxane, polyphenylsilsesquioxane and polyvinylsilsesquioxane. Suitable specific polysilsesquioxanes include, but are not limited to, acrylopoly oligomeric silsesquioxane (Catalog # MA0736) from Hybrid Plastics of Hattiesburg, Miss.; polymethylsilsesquioxane from Techneglas of Columbus, Ohio and sold under the label GR653L, GR654L, and GR650F; polyphenylsilsesquioxane from Techneglas of Columbus, Ohio and sold under the label GR950F; and polymethylphenylsilsesquioxane from Techneglas of Columbus, Ohio and sold under the label GR9O8F.

The polymer binder may also comprise other alkoxysilanes, such as tetraalkoxysilanes and alkyltrialkoxysilanes having the formula: (R')x Si—(OR2)y wherein R' may be an alkyl, alkylaryl, arylalkyl, aryl, alcohol, polyglycol, or polyether group, or a combination or mixture thereof; R2 may be an alkyl, acetoxy, or a methoxyethoxygroup, or a mixture thereof, x=from 0 to 3 and y=from 4 to 1 respectively, with the proviso that x+y=4. The one or more alkoxysilanes including mono-, di-, tri-, and tetraalkoxysilanes may be added to control the crosslink density of the organosiloxane network and control the physical properties of the organosiloxane network including flexibility and adhesion promotion. Examples of such alkoxysilanes include, but are not limited to, tetraethoxysilane, tetramethoxysilane, methyltriethoxysilane, and methyltrimethoxysilane. Such ingredients may be present in an amount of about 0 to 50 weight percent.

The polymer composite includes nanoparticles. The nanoparticles may include silica, zirconia, titania, alumina, clay, metals, or other inorganic materials. The loading of the nanoparticles is typically greater than 50 vol %.

Polymer composite pillars based on nanoparticle filled polymers can be formed by casting a paste into a mold, the mold cavity having the inverse shape and corresponding dimensions of the desired pillar body. This type of mold may be referred to as a negative master. The pastes comprise a thermal or radiation curable composite binder formulation and inorganic nanoparticles. The paste can then be cured using the appropriate form of radiation, yielding solid, polymer composite pillar bodies. When removed from the mold cavity, the pillar bodies have the inverse shape of the mold cavity from which they were formed. A plurality of structures or at least one channel can be included in the body by including the inverse shape of the plurality of structures or at least one channel in the surface of the mold corresponding to the first surface or second surface of the pillar body.

In some embodiments, the body may further include a functional layer on at least a portion of the body. Functional layers or coating may be added as a layer or an enveloping coating around a pillar body. Functional coatings have been disclosed in pending U.S. application Ser. No. 14/025,958, titled "VACUUM GLAZING PILLARS FOR INSULATED GLASS UNITS", filed Sep. 13, 2013, which has been incorporated herein by reference in its entirety. The functional layer may include at least one of a compliant layer comprising a thermally stable polymer, a compliant layer comprising inorganic nanoparticles, a ferromagnetic layer, an electrically conductive layer, a statically dissipative layer and an adhesive; and optionally, wherein the adhesive comprises a sacrificial material.

A compliant planarization layer is one example of a functional layer that may be coated as a layer or an enveloping coating around a pillar body, e.g. a sintered ceramic pillar body, and is a thermally stable crosslinked nanocomposite that serves to flatten and smooth one or both of the major pillar body surfaces. The planarization layer may also allow for a slight compression of the pillar during the fabrication of an insulated glass unit and thus reduce the likelihood of glass crack initiation or propagation upon evacuation to reduced pressure or to other environmental impacts. The planarization layer comprises an organic, inorganic, or hybrid polymeric binder and an optional inorganic nanoparticle filler.

The polymeric binder may include thermally stable organic polymeric species. These materials are typically dimensionally stable upon exposures to temperatures up to 350° C. Preferably, the binder material has a low thermal conductivity, which would reduce the transfer of heat from the exterior through to the interior window pane. Thermally stable organic polymeric component may be selected from thermally stable binders, thermally stable inorganic, siloxane, or hybrid polymeric species previously described.

A planarizing process for composite pillars can be carried out by thermal or radiation curing of the planarization material on one or both major surfaces of a pillar body while it is between two flat surfaces. The composition may be identical to that of the composite pillars. The planarization layer can have either adhesive or lubricant characteristic.

The compliant adhesive layer comprises a thermal or radiation sensitive silsesquioxane, a photoinitiator, and a nanoparticle filler. The material can be crosslinked photochemically and then heated to initiate condensation of the silanol groups of the silsesquioxane, forming a durable, thermally stable material. In addition to providing adhesion between the pillar and one of the glass panes, the adhesive layer can be used to set the final pillar height and define (minimize) the pillar height variation.

The orientation layer is a material applied to a pillar body while it is still in the mold. The orientation can be on the mold side or the air side. The air side is the exposed surface of the pillar when it is in the mold. The function of the orientation layer is to physically or chemically differentiate the mold and air sides during placement of the pillars on a surface. The orientation layer can be electrically conductive or statically dissipative, ferromagnetic, ionic, hydrophobic, or hydrophilic.

The frit glass coating is a dispersion of low melting glass microparticles in a sacrificial binder that is applied uniformly to the exterior of the pillar body. During the vacuum insulated glass unit assembly process, the sacrificial binder is thermally decomposed and the frit glass flows to form an adhesive bond to one or both of the glass panes. Sacrificial polymers such as, for example, nitrocellulose, ethyl cellulose, alkylene polycarbonates, [meth]acrylates, and polynorbonenes can be used as binders.

The low COF layer may be a thermally stable material that promotes slip between the pillar body and a flat surface (e.g., one of the inner glass surfaces in a vacuum insulated glass unit). The layer may comprise a monolayer of fluorosilanes, a fluorinated nanoparticle filled polyimide (e.g., Corin XLS, NeXolve, Huntsville, Ala.), a thin coating of a low surface energy polymer (e.g., PVDF or PTFE), a diamond-like carbon (DLC) layer, or a lamellar layer comprising graphite, or other thermally stable lubricant materials.

Figure 4A:
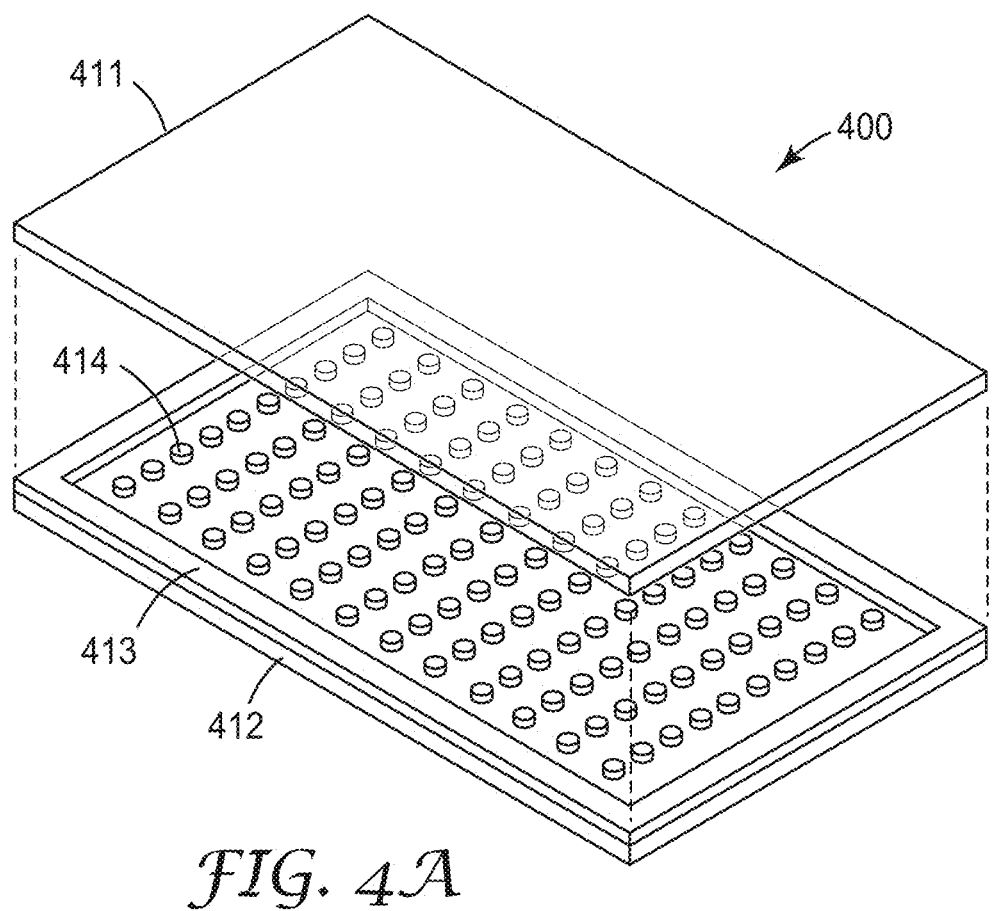
FIG. 4A is an exploded perspective view of a vacuum insulated glass unit.
Figure 4B:
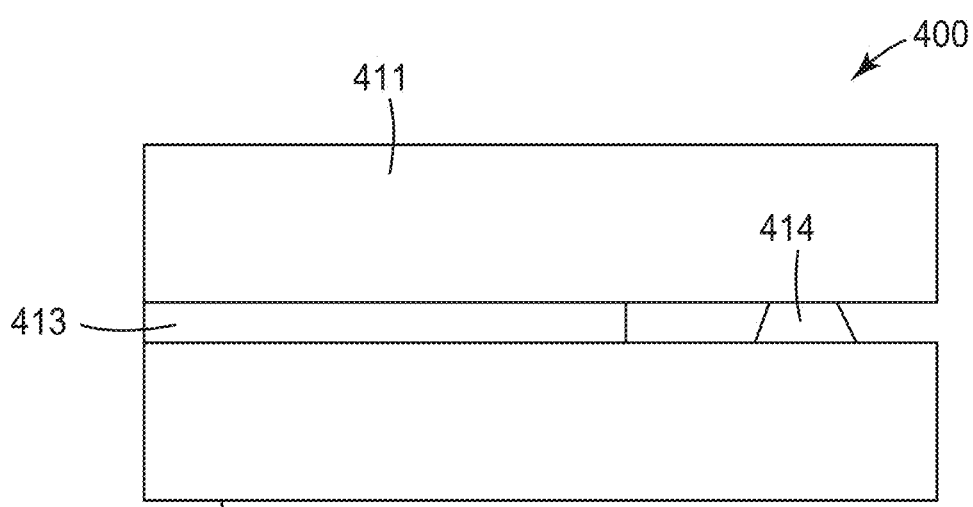
FIG. 4B is a side sectional view of a portion of a vacuum insulated glass unit.

In another embodiment, the present disclosure includes a vacuum insulated glass unit having pillars, comprising: a first glass pane; a second glass pane opposite and substantially co-extensive with the first glass pane; an edge seal between the first and second glass panes with a substantial vacuum gap between the first and second glass panes; and a plurality of pillars, according to any one of the previously described pillar embodiments, disposed between the first and second glass panes. The use of pillars in IGUs is known in the arts and the pillars of the present disclosure can be included in an IGU using conventional techniques. A vacuum insulated glass unit 400 is shown in FIGS. 4A and 4B. Unit 400 includes two panes of glass 411 and 412 separated by a vacuum gap. Pillars 414 in the gap maintain the separation of glass panes 411 and 412, which are hermetically sealed together by an edge seal 413, which may be a low melting point glass frit.

Select embodiments of the present disclosure include, but are not limited to, the following:

In a first embodiment, the present disclosure provides a pillar for use in a vacuum insulated glass unit comprising:
 a body comprising:
  a first surface and an opposed second surface; wherein the first surface comprises:
   a plurality of first structures, each first structure having a first structure base and a first structure face opposite the base;
   at least one first void region between the plurality of first structures; and
   a first land surface region located between the plurality of first structures, the first land surface region interconnected with the first structure bases;
  at least one sidewall;
  a first peripheral edge adjoining the first surface and the at least one sidewall and a second peripheral edge adjoining the second surface and the at least one sidewall;
  at least one first channel having first and second ends and a first channel opening proximate the first surface;
 wherein the first channel is in fluid communication with the local environment through at least one of its first and second ends;
 wherein the at least one first void region is in fluid communication with at least one of the local environment in a direction parallel to the first surface and the at least one first channel;
 wherein the height of the plurality of first structures is less than the depth of the first channel; and
wherein the largest dimension of the body parallel to the first surface is between about 10 microns and about 1000 microns.

In a second embodiment, the present disclosure provides a pillar for use in a vacuum insulated glass unit according to the first embodiment, wherein at least a portion of the first structure faces of the plurality of first structures include microstructure texture and the height of the microstructure texture is less than the height of the plurality of first structures.

In a third embodiment, the present disclosure provides a pillar for use in a vacuum insulated glass unit according to the second embodiment, wherein the height of the microstructure texture is between about 5 nm and about 5 microns.

In a fourth embodiment, the present disclosure provides a pillar for use in a vacuum insulated glass unit according to any one of the first through third embodiments, wherein the compressive strength of the pillars is between about 400 MPa and about 50 GPa.

In a fifth embodiment, the present disclosure provides a pillar for use in a vacuum insulated glass unit according to any one of the first through fourth embodiments, wherein the body comprises a continuous, inorganic matrix.

In a sixth embodiment, the present disclosure provides a pillar for use in a vacuum insulated glass unit according to the fifth embodiment, wherein the continuous, inorganic material comprises a sintered ceramic, glass frit, glass beads or glass bubbles, metal, and combinations thereof.

In a seventh embodiment, the present disclosure provides a pillar for use in a vacuum insulated glass unit according to the sixth embodiment, wherein the sintered ceramic comprises at least one of zirconia, alumina, silica, silicon carbide and silicon nitride.

In a eighth embodiment, the present disclosure provides a pillar for use in a vacuum insulated glass unit according to the sixth or seventh embodiments, wherein the sintered ceramic comprises zirconia.

In a ninth embodiment, the present disclosure provides a pillar for use in a vacuum insulated glass unit according to any one of first through eighth embodiments, wherein the draft angle between the sidewall and first surface is between about 90 degrees and about 135 degrees.

In a tenth embodiment, the present disclosure provides a pillar for use in a vacuum insulated glass unit according to any one of first through ninth embodiments, wherein the draft angle between the sidewall and first surface is between about 90 degrees and 110 degrees.

In an eleventh embodiment, the present disclosure provides a pillar for use in a vacuum insulated glass unit according to any one of first through tenth embodiments, wherein the body further comprises a functional layer on at least a portion of the body.

In a twelfth embodiment, the present disclosure provides a pillar for use in a vacuum insulated glass unit according to the eleventh embodiment, wherein the functional layer comprises at least one of a compliant layer comprising a thermally stable polymer, a compliant layer comprising inorganic nanoparticles, a ferromagnetic layer, an electrically conductive layer, a statically dissipative layer and an adhesive; and optionally, wherein the adhesive comprises a sacrificial material.

In a thirteenth embodiment, the present disclosure provides a pillar for use in a vacuum insulated glass unit according to any one of the first through twelfth embodiments, wherein the at least one sidewall includes between 3 sidewalls and 30 sidewalls.

In a fourteenth embodiment, the present disclosure provides a pillar for use in a vacuum insulated glass unit according to any one of first through thirteenth embodiments, wherein the at least one sidewall includes between 3 sidewalls and 12 sidewalls.

In a fifteenth embodiment, the present disclosure provides a pillar for use in a vacuum insulated glass unit according to any one of the first through the fourteenth embodiments, wherein at least a portion of the first peripheral edge is at least one of a rounded peripheral edge and a chamfered peripheral edge.

In a sixteenth embodiment, the present disclosure provides a pillar for use in a vacuum insulated glass unit according to any one of the first through fifteenth embodiments, wherein the entire first peripheral edge is at least one of a rounded peripheral edge and a chamfered peripheral edge.

In a seventeenth embodiment, the present disclosure provides a pillar for use in a vacuum insulated glass unit according to any one of the first through sixteenth embodiments, wherein at least a portion of the second peripheral edge is at least one of a rounded peripheral edge and a chamfered peripheral edge.

In an eighteenth embodiment, the present disclosure provides a pillar for use in a vacuum insulated glass unit according to anyone of the first through seventeenth embodiments, wherein at least a portion of the second peripheral edge is at least one of a rounded peripheral edge and a chamfered peripheral edge.

In a nineteenth embodiment, the present disclosure provides a pillar for use in a vacuum insulated glass unit according to any one of the first through the eighteenth embodiments, wherein the body is a precisely shaped body.

In a twentieth embodiment, the present disclosure provides a pillar for use in a vacuum insulated glass unit according to any one of the first through the nineteenth embodiments, wherein the second surface comprises:
at least one of a plurality of second structures and at least one second channel having first and second ends and a second channel opening proximate the second surface, wherein each second structure has a second structure base and a second structure face opposite the base, at least one second void region between the plurality of second structures, a second land surface region located between the plurality of second structures, the second land surface region interconnected with the second structure bases;
wherein the second channel is in fluid communication with the local environment through at least one of its first and second ends;
wherein the at least one second void region is in fluid communication with at least one of the local environment in a direction parallel to the first surface and the at least one second channel; and
wherein the height of the plurality of second structures is less than the depth of the channel.

In a twenty-first embodiment, the present disclosure provides a pillar for use in a vacuum insulated glass unit according to the twentieth embodiment, wherein at least a portion of the second structure faces of the plurality of second structures include microstructure texture and the height of the microstructure texture is less than the height of the plurality of second structures.

In a twenty-second embodiment, the present disclosure provides a pillar for use in a vacuum insulated glass unit according to the twenty-first embodiment, wherein the height of the microstructure texture is between about 5 nm and about 5 microns.

In a twenty-third embodiment, the present disclosure provides a pillar for use in a vacuum insulated glass unit according to anyone of the twentieth through twenty-second embodiments, wherein the draft angle between the sidewall and second surface is between about 90 degrees and about 135 degrees.

In a twenty-fourth embodiment, the present disclosure provides a pillar for use in a vacuum insulated glass unit according to any one of the twentieth through twenty-third embodiments, wherein the draft angle between the sidewall and second surface is between about 90 degrees and 110 degrees.

In a twenty-fifth embodiment, the present disclosure provides a pillar for use in a vacuum insulated glass unit according to any one of the first through twenty-fourth embodiments, wherein the shape of the pillar is one of circular cylindrical, elliptical cylindrical, polygonal prisms, pyramidal, truncated pyramidal, cuboidal, conical, truncated conical, annular and spiral.

In a twenty-sixth embodiment, the present disclosure provides a vacuum insulated glass unit having pillars, comprising:
a first glass pane;
a second glass pane opposite and substantially co-extensive with the first glass pane;
an edge seal between the first and second glass panes with a substantial vacuum gap between the first and second glass panes; and
a plurality of pillars, according to any one of the first through twenty-fifth embodiments, disposed between the first and second glass panes.

EXAMPLES

Vacuum glazing pillar articles were prepared by using sol casting and molding methods with organic burnout and sintering processes. The resultant constructions provide pillars with reduced surface area as shown in the following examples.

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company, St. Louis, Mo. unless otherwise noted.

Materials:

| Material or abbreviation | Description |
|---|---|
| MEEAA | 2-(2-(2-Methoxyethoxy) Ethoxy) Acetic Acid obtained from Aldrich Chemical Company, Milwaukee, WI, USA. |

| Material or abbreviation | Description |
| --- | --- |
| Zirconium acetate | An aqueous solution of zirconium acetate containing nominally 16.3 weight percent zirconium obtained from Magnesium Elektron, Inc., Flemington, NJ, USA. The aqueous solution was exposed to an ion exchange resin (obtained under the trade designation "AMBERLYTE IR 120" from Rohm and Haas Company, Philadelphia, PA, USA) before use (oxide content 21.85 wt. %). |
| Yttrium acetate | Yttrium (III) acetate tetrahydrate obtained from AMR Technologies Inc., Toronto, Canada (oxide content 33.4 wt. %). |
| DI water | De-ionized water. |
| IRGA-CURE 819 | UV/Visible photoinitiator available under trade designation "IRGACURE 819" from BASF Corporation Vandalia, IL, USA. |
| SR454 | Ethoxylated trimethylolpropane triacrylate, obtained from Sartomer Company Inc., Exton, PA, USA, under the trade designation "SR454". |
| Diethylene glycol monoethyl ether | Diethylene glycol monoethyl ether obtained from Alfa Aesar, Ward Hill, MA, USA. |
| Ethanol | KOPTEC 200 proof ethanol obtained from DLI, King of Prussia, PA, USA. |
| Acrylic acid | Acrylic acid obtained from Alfa Aesar, Ward Hill, MA, USA. |
| HEAA | N-(2-Hydroxyethyl) acrylamide obtained from Tokyo Chemical Industry Co., LTD. Tokyo, Japan. |
| V-330 | Silicone rubber compound obtained from Freeman Casting, Avon, OH as V-330 |
| SILTA-STIC M | RTV Silicone Rubber base and curing agent obtained from Dow Corning, Midland, MI as "SILTASTIC M". |

Sol Batch Preparation Procedure

Preparation of $ZrO_2$ (88 Mol %)/$Y_2O_3$ (12 Mol %) Sol.

Sol compositions are reported in mole percent inorganic oxide. The following hydrothermal reactor was used for preparing the Sol. The hydrothermal reactor was prepared from 15 meters of stainless steel braided smooth tube hose (0.64 cm inside diameter, 0.17 cm thick wall; obtained under the trade designation "DUPONT T62 CHEMFLUOR PTFE" from Saint-Gobain Performance Plastics, Beaverton, Mich.). This tube was immersed in a bath of peanut oil heated to the desired temperature. Following the reactor tube, a coil of an additional 3 meters of stainless steel braided smooth tube hose ("DUPONT T62 CHEMFLUOR PTFE"; 0.64 cm I.D., 0.17 cm thick wall) plus 3 meters of 0.64 cm stainless-steel tubing with a diameter of 0.64 cm and wall thickness of 0.089 cm that was immersed in an ice-water bath to cool the material and a backpressure regulator valve was used to maintain an exit pressure of 3.45 MPa.

A precursor solution was prepared by combining the zirconium acetate solution (6,200 grams) with DI water (2074.26 grams). Yttrium acetate (992.62 grams) were added while mixing until fully dissolved. The solids content of the resulting solution was measured gravimetrically (120° C./hr. forced air oven) to be 22.30 wt. %. D.I. water (2,289 grams) was added to adjust the final concentration to 19 wt. %. The resulting solution was pumped at a rate of 11.48 ml/min. through the hydrothermal reactor. The temperature was 225° C. and the average residence time was 42 minutes. A clear and stable zirconia sol was obtained.

Sol Concentration

The resulting sol was concentrated (35-45 wt. % solids) via ultrafiltration and further diafiltered using a membrane cartridge (obtained under the trade designation "M21S-100-01P" from Spectrum Laboratories Inc., Rancho Dominguez, Calif.). The final sol composition was 34.68 wt. % oxide and 3.70 wt. % acetic acid.

Polymer Tool Preparation Procedure

A master tool with the desired shape of the pillar was fabricated/provided. A polypropylene tool was generated from the master tool, a 0.0625 inch thick (0.159 cm) sheet of polypropylene (available from McMaster Carr, Elmhurst, Ill., USA) was placed on top of the master tool and embossed for 2 minutes at 340° F. (171° C.) and 2000 psi using a PHI manual press (model number PW-220H, available from PHI, City of Industry, Calif., USA). The pressure was released and temperature was reduced to 75° C. (24° C.) and the polypropylene polymer tool was separated from the master tool.

A silicone tool was generated from the master tool by casting the silicone resin directly onto the master tool and allowing it to cure. After curing, the silicone polymer mold was peeled off the master tool.

Example 1—Micro-Molded, Structured, Annular Shaped Pillars

Preparation of $ZrO_2$ (97.7 Mol %)/$Y_2O_3$ (2.3 Mol %) Sol

A precursor solution was prepared and processed similar to the sol batch preparation procedure described above except that the composition of the sol was $ZrO_2$ (97.7 mol %)/$Y_2O_3$ (2.3 mol %) Sol.

Sol Concentration

The sol composition after processing via one or more of ultrafiltration, diafiltration and distillation was 40.32 wt. % oxide and 4.00 wt. % acetic acid.

Preparation of Casting Sol

The above sol (599.98 grams), MEEAA (8.66 grams), and diethylene glycol monoethyl ether (129.34 grams) were charged to a 1000 ml RB flask. The sample weight was reduced via rotary evaporation to yield a concentrated sol (392.94 grams, 61.57 wt. % oxide). The concentrated sol (299.59 grams) was charged to a jar and combined with diethylene glycol monoethyl ether (12.75 grams), acrylic acid (20.10 grams), and ethoxylated pentaerythritol triacrylate (SR454) (34.90 grams). IRGACURE 819 (1.62 grams) was dissolved in ethanol (77.82 grams) and charged to the sol. The sol was passed through a 1 micron filter.

Sol Casting

The sol (97.7 mol % $ZrO_2$/2.3 mol % $Y_2O_3$) was cast into a silicone sheet mold (V-330 available from Freeman Casting, Avon, Ohio, USA) containing structured, annular shaped structures with dimension of about 1200 microns across by 300 microns deep. The mold was adhered to a 2"×3" (5×7.5 cm) glass plate with doubled sided tape. The sol was flood coated onto the tool using a pipette. A PET film was then carefully placed over the filled tool to prevent significant void formation. A 2"×3" (5×7.5 cm) glass plate was then placed on top of the PET, pressure was applied by hand to remove excess sol and the construction was clamped together. The sol was cured for 2 minutes using a 380-401 nm LED light source at 100% power (CF2000 rev. 3.0 available from Clearstone Technologies Hopkins, Minn., USA). The cured parts were removed from the tool by removing the clamps, the top glass plate and the PET film and flexing the tool. The parts were allowed to drop onto a nylon mesh screen. This allowed the annular shaped pillars to dry equally from all sides at room temperature for 16 hours. The dried annular shaped xerogels were then burned out and sintered as follows:

Organic Burnout and Sinter Process

Figure 5:
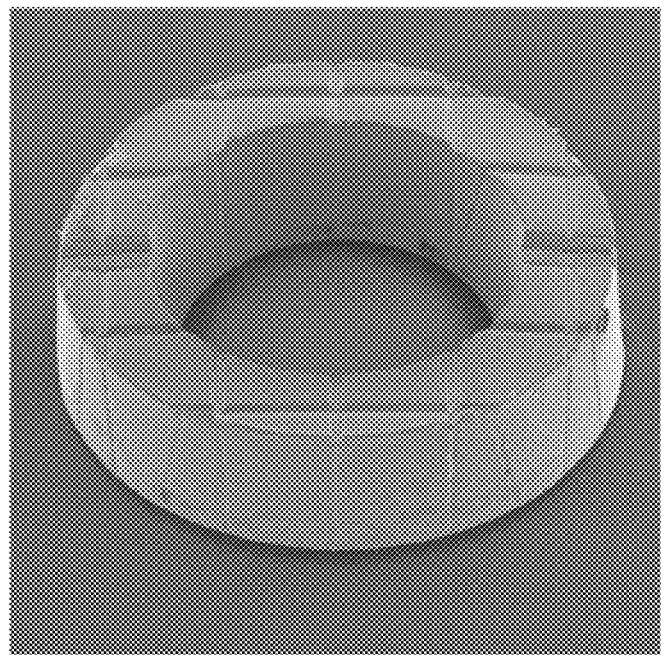
FIG. 5 is an SEM image of an exemplary pillar according to one exemplary embodiment of the present disclosure.
Figure 6:
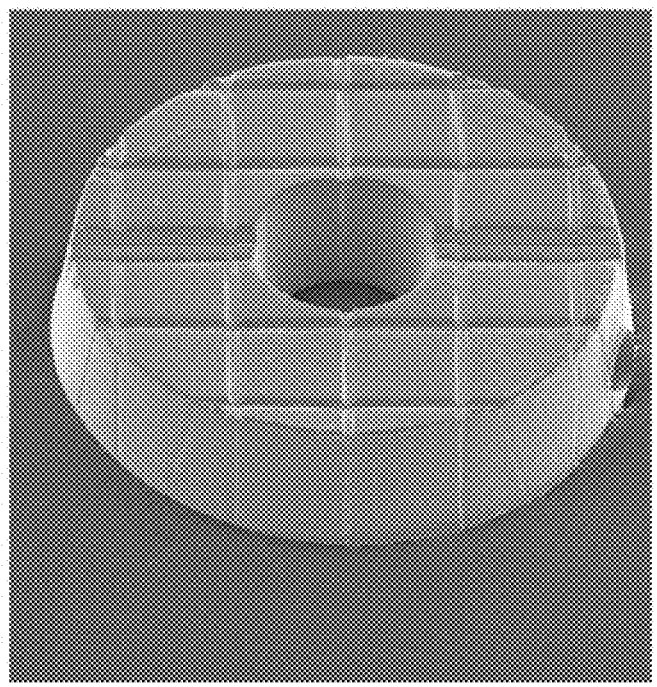
FIG. 6 is an SEM image of an exemplary pillar according to one exemplary embodiment of the present disclosure.

Set pillars in an alumina crucible, then fired in air according to the following schedule:
1—Heat from 20° C. to 500° C. at 60° C./hr rate,
2—Heat from 500° C. to 1320° C. at 120° C./hr rate,
3—Hold at 1320° C. for 2 hours,
4—Cool from 1320° C. to 20° C. at 600° C./hr rate, The structured, annular shaped pillars shown in FIG. 5 and FIG. 6 were produced. FIG. 5 is an SEM image of the structured, annular shaped pillar with a center through hole of approximately 370 microns. FIG. 6 is an SEM image of the structured, annular shaped pillar with a center through hole of approximately 170 microns. The pillars also include a plurality of first structures and one channel.

Figure 7A:
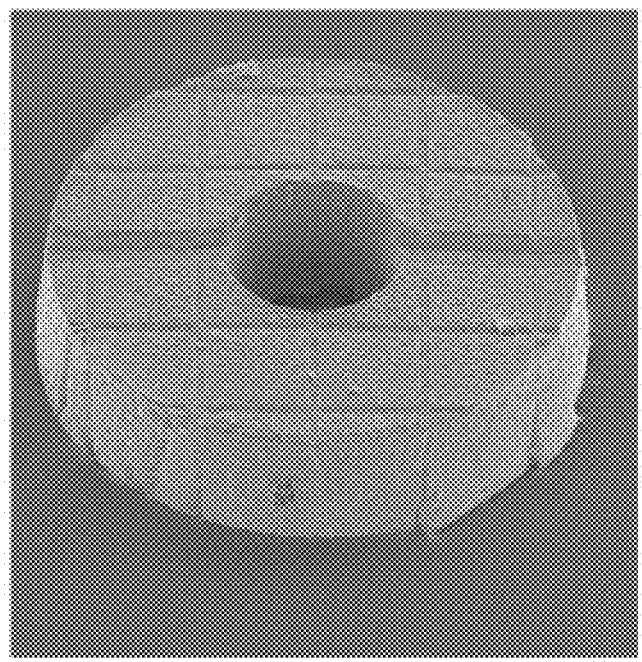
FIG. 7A is an SEM image of an exemplary pillar according to one exemplary embodiment of the present disclosure.
Figure 7B:
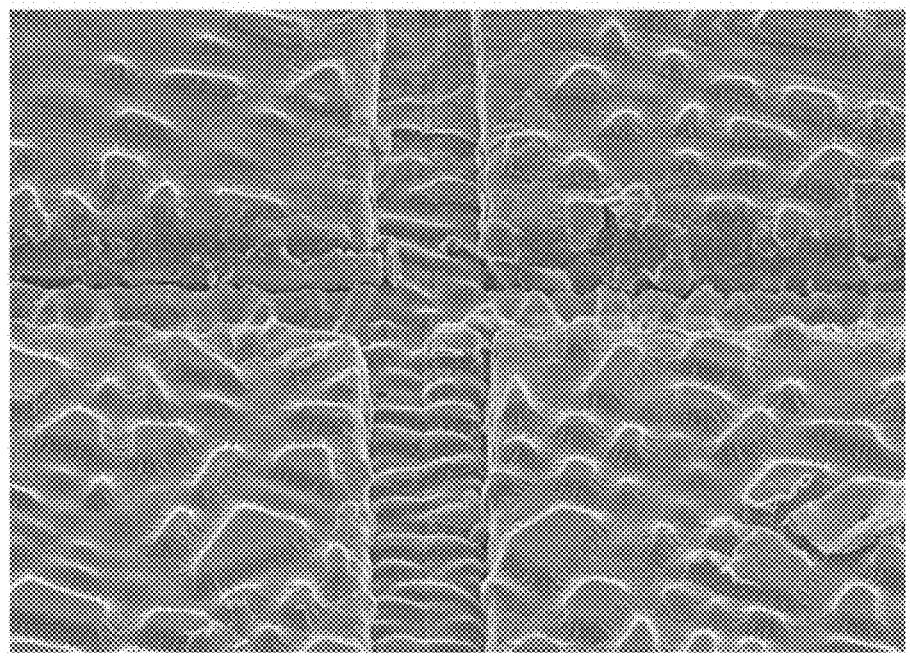
FIG. 7B is an SEM image of the exemplary pillar of FIG. 7A shown at a higher magnification, according to one exemplary embodiment of the present disclosure.

Example 2—Micro-Molded, Structured, Annular Shaped Pillar with Surface Microstructure Texture Sol preparation procedure was identical to Example 1.
Sol Casting The sol (97.7 mol % $ZrO_2$/2.3 mol % $Y_2O_3$) was cast into a plasma treated (800 sccm $O_2$ at 500 watts for 60 seconds then 800 sccm $O_2$+40 sccm hexamethyldisiloxane at 1500 watts for 90 secs) silicone V-330 sheet mold, comprising annular shaped wells about 1200 microns across by 300 microns deep. The mold was adhered to a 2"×3" (5×7.5 cm) glass plate with doubled sided tape. The sol was flood coated onto the tool using a pipette. A PET film was then carefully placed over the filled tool to prevent significant void formation. A 2"×3" (5×7.5 cm) glass plate was then placed on top of the PET, pressure was applied by hand to remove excess sol and the construction was clamped together. The sol was cured for 2 minutes using a 380-401 nm LED light source at 100% power (CF2000 rev. 3.0 available from Clearstone Technologies Hopkins, Minn., USA). The cured parts were removed from the tool by removing the clamps, the top glass plate and the PET film and flexing the tool. The parts were allowed to drop onto a nylon mesh screen. This allowed the structured and microstructured, annular shaped pillars to dry equally from all sides at room temperature for 16 hours. The dried, structured and microstructured, annular shaped xerogels were then burned out and sintered as follows:
Organic Burnout and Sinter Process Set pillars in an alumina crucible, then fired in air according to the following schedule:
1—Heat from 20° C. to 500° C. at 60° C./hr rate,
2—Heat from 500° C. to 1320° C. at 120° C./hr rate,
3—Hold at 1320° C. for 2 hours,
4—Cool from 1320° C. to 20° C. at 600° C./hr rate, The structured, annular shaped pillar with surface microstructure texture shown in FIGS. 7a and 7b were produced. FIG. 7a is an SEM image of the structured, annular shaped pillar with surface microstructure texture. FIG. 7b is a higher magnification SEM image of the microstructure texture on the surface of the structured, annular shaped pillar. The pillar also include a plurality of first structures and one channel.

Figure 8A:
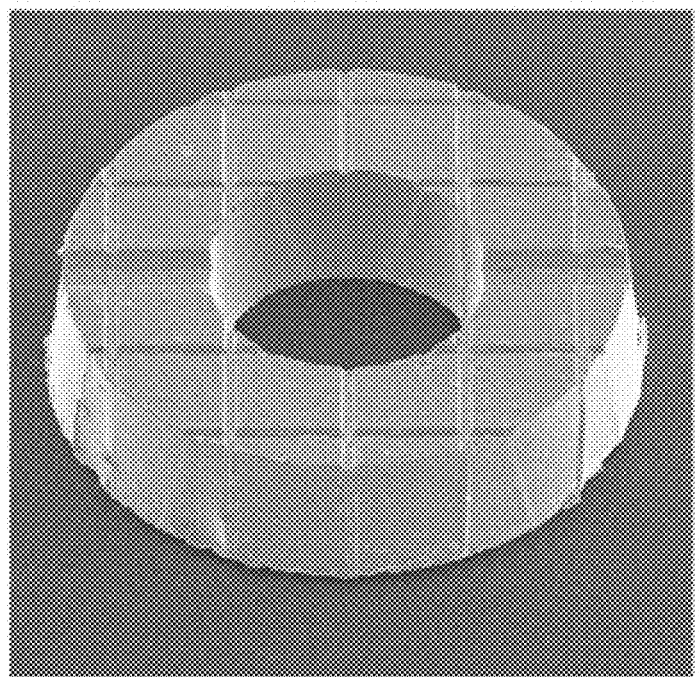
FIG. 8A is an SEM image of an exemplary pillar, showing the pillar's first surface, according to one exemplary embodiment of the present disclosure.
Figure 8B:
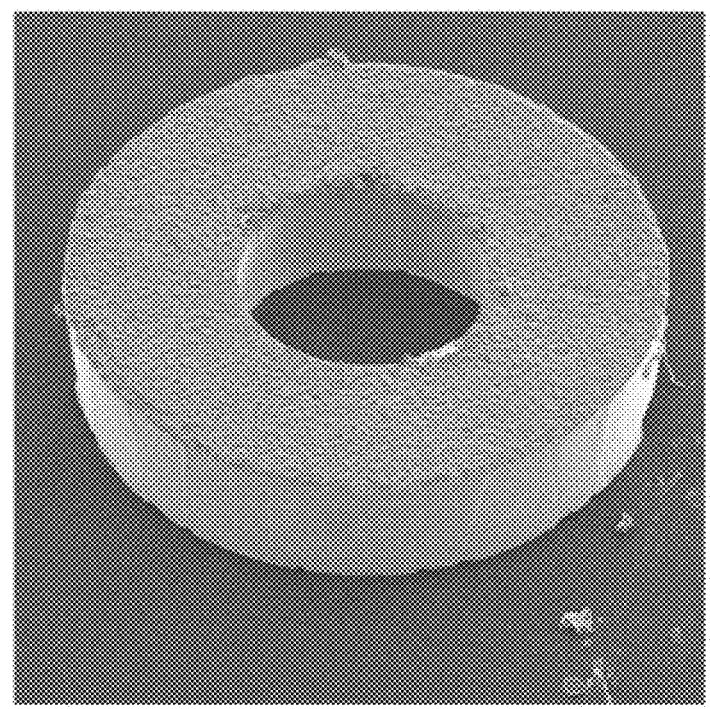
FIG. 8B is an SEM image of the exemplary pillar of FIG. 8A, showing the pillar's second surface, according to one exemplary embodiment of the present.

Example 3—Micro-Molded, Annular Shaped Pillars with Structure on Top and Bottom Surfaces Sol preparation procedure was identical to Example 1.
Sol Casting The sol (97.7 mol % $ZrO_2$/2.3 mol % $Y_2O_3$) was cast into a polypropylene sheet mold containing structured, annular shaped wells with dimension of about 1200 microns across by 300 microns deep. The mold was adhered to a 2"×3" (5×7.5 cm) glass plate with doubled sided tape. The sol was flood coated onto the tool using a pipette. A structured PET film, having a structure described in International Patent Application WO2014/081693, sample 507-1 FIG. 15 was then carefully placed structured side down onto the filled tool to prevent significant void formation. A 2"×3" (5×7.5 cm) glass plate was then placed on top of the structured PET film, pressure was applied by hand to remove excess sol and the construction was clamped together. The sol was cured for 2 minutes using a 380-401 nm LED light source at 100% power (CF2000 rev. 3.0 available from Clearstone Technologies Hopkins, Minn., USA). The cured structured, annular shaped parts were removed from the tool. This was done by removing the glass cover plate and structured PET film immediately followed by applying a sonic wand at 45% amplitude to the back of the tool. The pillars, with structure imparted on both top and bottom surfaces released from the tool and dropped onto a nylon mesh screen. This allowed the structured, annular shaped pillars to dry equally from all sides. The dried, structured, annular shaped xerogels were then burned out/pre-sintered as follows:
Organic Burnout and Sinter Process Set pillars in an alumina crucible, then fired in air according to the following schedule:
1—Heat from 20° C. to 500° C. at 60° C./hr rate,
2—Heat from 500° C. to 1320° C. at 120° C./hr rate,
3—Hold at 1320° C. for 2 hours,
4—Cool from 1320° C. to 20° C. at 600° C./hr rate, The annular shaped pillars with structure on both surfaces shown in FIGS. 8A and 8B were produced. FIG. 8A is an SEM image of the structured top surface (first surface) of the annular shaped pillar. FIG. 8B is an SEM image of the structured bottom surface (second surface) of the annular shaped pillar shown in FIG. 8A. The pillars also include a plurality of first structures and one channel.

What is claimed:

1. A pillar for use in a vacuum insulated glass unit comprising:
 a body comprising:
  a first surface and an opposed second surface; wherein the first surface comprises:
   a plurality of first structures, each first structure having a first structure base and a first structure face opposite the base;
   at least one first void region between the plurality of first structures; and
   a first land surface region located between the plurality of first structures, the first land surface region interconnected with the first structure bases;
  at least one sidewall;
  a first peripheral edge adjoining the first surface and the at least one sidewall and a second peripheral adjoining the second surface and the at least one sidewall;
  at least one first channel having first and second ends and a first channel opening proximate the first surface;
  wherein the first channel is in fluid communication with the local environment through at least one of its first and second ends;
  wherein the at least one first void region is in fluid communication with at least one of the local environment in a direction parallel to the first surface and the at least one first channel;
  wherein the height of the plurality of first structures is less than the depth of the first channel; and wherein the largest dimension of the body parallel to the first surface is between about 10 microns and about 1000 microns.

2. The pillar for use in a vacuum insulated glass unit according to claim 1, wherein at least a portion of the first structure faces of the plurality of first structures include microstructure texture and the height of the microstructure texture is less than the height of the plurality of first structures.

3. The pillar for use in a vacuum insulated glass unit according to claim 2, wherein the height of the microstructure texture is between about 5 nm and about 5 microns.

4. The pillar for use in a vacuum insulated glass unit according to claim 1, wherein the compressive strength of the pillars is between about 400 MPa and about 50 GPa.

5. The pillar for use in a vacuum insulated glass unit according to claim 1, wherein the body comprises a continuous, inorganic matrix.

6. The pillar for use in a vacuum insulated glass unit of claim 1, wherein the continuous, inorganic material comprises a sintered ceramic, glass frit, glass beads or glass bubbles, metal, and combinations thereof.

7. The pillar for use in a vacuum insulated glass unit of claim 6, wherein the sintered ceramic comprises at least one of zirconia, alumina, silica, silicon carbide and silicon nitride.

8. The pillar for use in a vacuum insulated glass unit of claim 7, wherein the sintered ceramic comprises zirconia.

9. The pillar for use in a vacuum insulated glass unit according to claim 1, wherein the draft angle between the sidewall and first surface is between about 90 degrees and about 135 degrees.

10. The pillar for use in a vacuum insulated glass unit according to claim 1, wherein the draft angle between the sidewall and first surface is between about 90 degrees and 110 degrees.

11. The pillar for use in a vacuum insulated glass unit of claim 1, wherein the body further comprises a functional layer on at least a portion of the body, wherein the functional layer is a compliant layer comprising a thermally stable polymer or a compliant layer comprising inorganic nanoparticles.

12. The pillar for use in a vacuum insulated glass unit of claim 11, wherein the functional layer is a ferromagnetic layer, an electrically conductive layer, a statically dissipative layer or an adhesive.

13. The pillar for use in a vacuum insulated glass unit according to claim 1, wherein the at least one sidewall includes between 3 sidewalls and 30 sidewalls.

14. The pillar for use in a vacuum insulated glass unit according to claim 1, wherein the at least one sidewall includes between 3 sidewalls and 12 sidewalls.

15. The pillar for use in a vacuum insulated glass unit according to claim 1, wherein at least a portion of the first peripheral edge is at least one of a rounded peripheral edge and a chamfered peripheral edge.

16. The pillar for use in a vacuum insulated glass unit according to claim 1, wherein the entire first peripheral edge is at least one of a rounded peripheral edge and a chamfered peripheral edge.

17. The pillar for use in a vacuum insulated glass unit according to claim 1, wherein at least a portion of the second peripheral edge is at least one of a rounded peripheral edge and a chamfered peripheral edge.

18. The pillar for use in a vacuum insulated glass unit according to claim 1, wherein the entire second peripheral edge is at least one of a rounded peripheral edge and a chamfered peripheral edge.

19. The pillar for use in a vacuum insulated glass unit of claim 1, wherein the body is a precisely shaped body.

20. A vacuum insulated glass unit having pillars, comprising:
    a first glass pane;
    a second glass pane opposite and substantially co-extensive with the first glass pane;
    an edge seal between the first and second glass panes with a substantial vacuum gap between the first and second glass panes; and
    a plurality of pillars, according to claim 1, between the first and second glass panes.

* * * * *